United States Patent
Lim et al.

(10) Patent No.: US 12,238,575 B2
(45) Date of Patent: Feb. 25, 2025

(54) TECHNIQUE FOR CONFIGURING PREAMBLE IN WIRELESS COMMUNICATION SYSTEM

(71) Applicant: LG ELECTRONICS INC., Seoul (KR)

(72) Inventors: Dongguk Lim, Seoul (KR); Jinsoo Choi, Seoul (KR); Eunsung Park, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 17/753,366

(22) PCT Filed: Sep. 3, 2020

(86) PCT No.: PCT/KR2020/011828
§ 371 (c)(1),
(2) Date: Feb. 28, 2022

(87) PCT Pub. No.: WO2021/045518
PCT Pub. Date: Mar. 11, 2021

(65) Prior Publication Data
US 2022/0330087 A1    Oct. 13, 2022

(30) Foreign Application Priority Data

Sep. 3, 2019   (KR) .................. 10-2019-0109145
Sep. 4, 2019   (KR) .................. 10-2019-0109711
Sep. 9, 2019   (KR) .................. 10-2019-0111766

(51) Int. Cl.
*H04L 27/20*       (2006.01)
*H04L 1/00*        (2006.01)
(Continued)

(52) U.S. Cl.
CPC .......... *H04W 28/06* (2013.01); *H04L 1/0061* (2013.01); *H04L 27/20* (2013.01); *H04W 84/12* (2013.01)

(58) Field of Classification Search
CPC .... H04W 28/06; H04W 84/12; H04L 1/0061; H04L 27/20
(Continued)

(56) References Cited

U.S. PATENT DOCUMENTS 11,870,628 B2 *   1/2024   Lim ................ H04L 5/0048
11,902,066 B2 *   2/2024   Lim ................ H04L 27/2603
(Continued)

FOREIGN PATENT DOCUMENTS

| KR | 1020170066578 | 6/2017 |
| WO | 2016089003    | 6/2016 |
| WO | 2019079256    | 4/2019 |

OTHER PUBLICATIONS

PCT International Application No. PCT/KR2020/011828, International Search Report dated Nov. 27, 2020, 3 pages.
(Continued)

*Primary Examiner* — Gbemileke J Onamuti
(74) *Attorney, Agent, or Firm* — LEE, HONG, DEGERMAN, KANG & WAIMEY

(57) ABSTRACT

An example according to the present specification relates to a technique for configuring a preamble in a wireless LAN (WLAN) system. A transmitting STA may generate and transmit an EHT PPDU. The EHT PPDU may comprise an L-SIG field, an RL-SIG field, a first control field, and a second control field. A result of "modulo 3 operation" for a length field value of the L-SIG field may be set to "0." The RL-SIG field may be configured to be the same as the L-SIG field. The first control field may comprise 3-bit information
(Continued)

on the version of a PPDU, 6-bit information on a BSS color, and 7-bit information on TXOP.

6 Claims, 28 Drawing Sheets

(51) Int. Cl.
*H04W 28/06* (2009.01)
*H04W 84/12* (2009.01)

(58) Field of Classification Search
USPC .......................................................... 370/338
See application file for complete search history.

(56) References Cited

U.S. PATENT DOCUMENTS

| | | | |
|---|---|---|---|
| 2016/0127948 A1* | 5/2016 | Azizi | H04W 28/18 |
| | | | 370/338 |
| 2019/0045461 A1 | 2/2019 | Fang et al. | |
| 2019/0097850 A1* | 3/2019 | Kenney | H04L 27/0012 |
| 2020/0136884 A1* | 4/2020 | Park | H04L 27/2602 |
| 2021/0385112 A1* | 12/2021 | Yoshikawa | H04L 69/322 |
| 2022/0103295 A1 | 3/2022 | Song et al. | |

OTHER PUBLICATIONS

United States Patent and Trademark Office U.S. Appl. No. 18/128,040, Office Action dated Jun. 9, 2023, 9 pages.
United States Patent and Trademark Office U.S. Appl. No. 18/128,040, Final Office Action dated Feb. 28, 2024, 8 pages.

* cited by examiner

FIG. 1
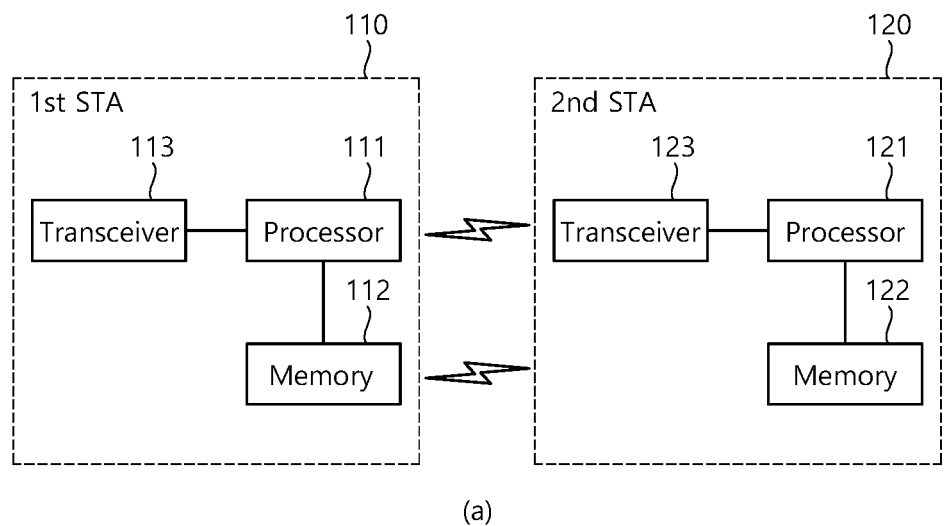
(a)
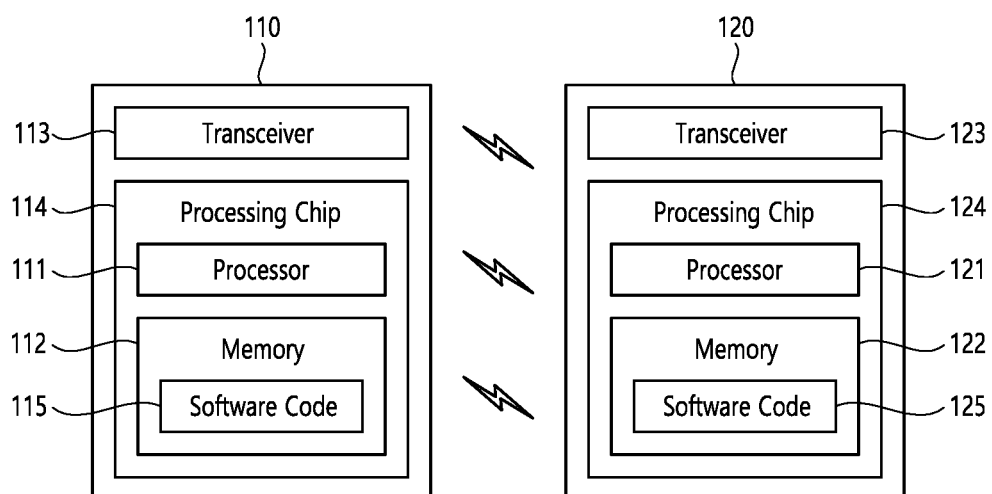
(b)

FIG. 2
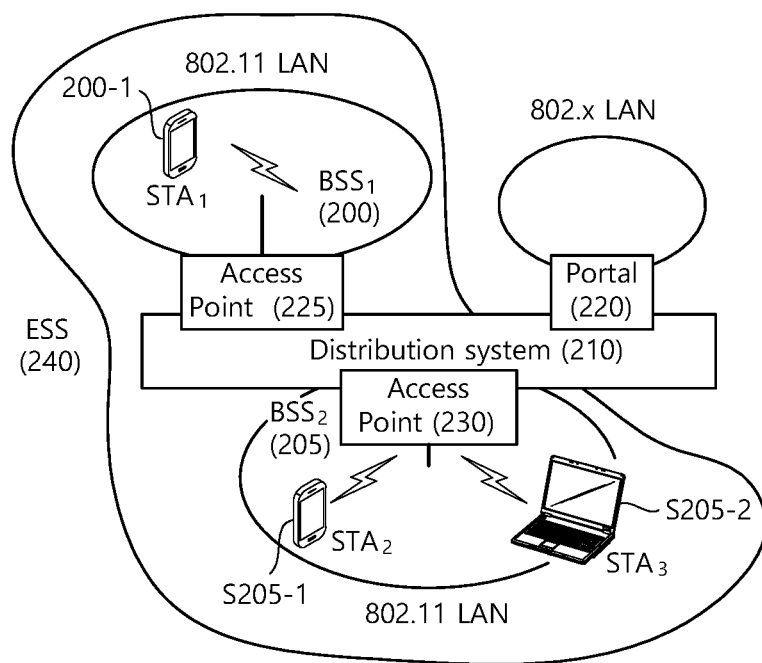
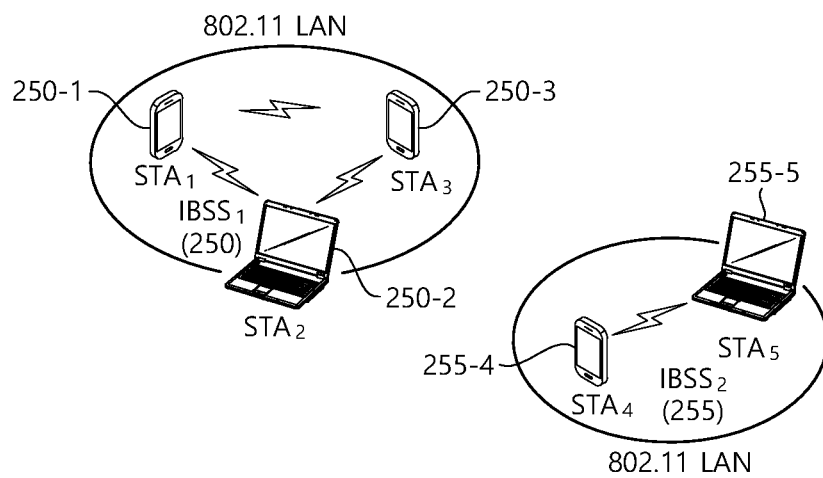

FIG. 23

| L-STF | L-LTF | L-SIG | EHT-SIG | ... | EHT-STF | EHT-LTF | EHT-data |

| L-STF | L-LTF | L-SIG | EHT-SIG | EHT-STF | EHT-LTF | EHT-data |

TECHNIQUE FOR CONFIGURING PREAMBLE IN WIRELESS COMMUNICATION SYSTEM

CROSS-REFERENCE TO RELATED APPLICATIONS

This application is the National Stage filing under 35 U.S.C. 371 of International Application No. PCT/KR2020/011828, filed on Sep. 3, 2020, which claims the benefit of earlier filing date and right of priority to Korean Application Nos. 10-2019-0109145, filed on Sep. 3, 2019, 10-2019-0109711, filed on Sep. 4, 2019, and 10-2019-0111766, filed on Sep. 9, 2019, the contents of which are all incorporated by reference herein in their entirety.

BACKGROUND

Technical Field

The present specification relates to a technique for configuring a preamble in a wireless LAN system, and more particularly, to a method for configuring a preamble in a wireless LAN system and an apparatus supporting the same.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Objective

In the EHT standard, a wide bandwidth (e.g., 160/320 MHz), 16 streams, and/or multi-link (or multi-band) operation may be used to support high throughput and high data rate. Accordingly, a new frame format may be used to support the transmission method (or operation). When the EHT signal of the new frame format is transmitted through the 2.4 GHz/5 GHz/6 GHz band(s), not only the EHT standard receiver but also conventional Wi-fi receivers (e.g., 802.11n, 802.11ac, 802.11ax standard STAs) may possibly receive the EHT signal transmitted through the band(s). In this case, a field for supporting backward compatibility with conventional Wi-Fi and for indicating an EHT signal may be required.

Technical Solutions

According to various embodiments, a transmitting station (STA) may generate an Extreme High Throughput Physical Protocol Data Unit (EHT PPDU) including an L-SIG field, a RL-SIG field, a first control field, and a second control field.

According to various embodiments, a result of "modulo 3 operation" to a value of a length field of the L-SIG field may be set to "0".

According to various embodiments, the RL-SIG field may be configured to be same as the L-SIG field.

According to various embodiments, the control field may include 3-bit information related to a version of a PPDU, 6-bit information related to a basic service set (BSS) color, and 7-bit information related to a transmission opportunity (TXOP). The first control field may further include first cyclic redundancy check (CRC) bits and first tail bits for the first control field.

According to various embodiments, the second control field may include second CRC bits and second tail bits for the second control field.

According to various embodiments, the first control field and the second control field may be separately encoded.

According to various embodiments, a transmitting station (STA) may transmit the EHT PPDU.

Technical Effects

According to various embodiments, the EHT PPDU may include an L-SIG field, a RL-SIG field, a first control field, and a second control field.

The receiving STA may identify that the received PPDU is an EHT PPDU based on the L-SIG field, the RL-SIG field, and the first control field. For example, the receiving STA may confirm that the received PPDU is an EHT PPDU based on the L-SIG field and the RL-SIG field. The receiving STA may confirm/determine that the received PPDU is an EHT PPDU based on the first control field.

According to various embodiments, there is an effect of reducing a packet detection error in the receiving STA. In addition, by including the L-SIG field in the EHT PPDU, backward compatibility with the convention Wi-Fi device may be supported.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 23 shows another example of an EHT PPDU.

FIG. 26 shows an example of an EHT PPDU.

DETAILED DESCRIPTION

Figure 3:
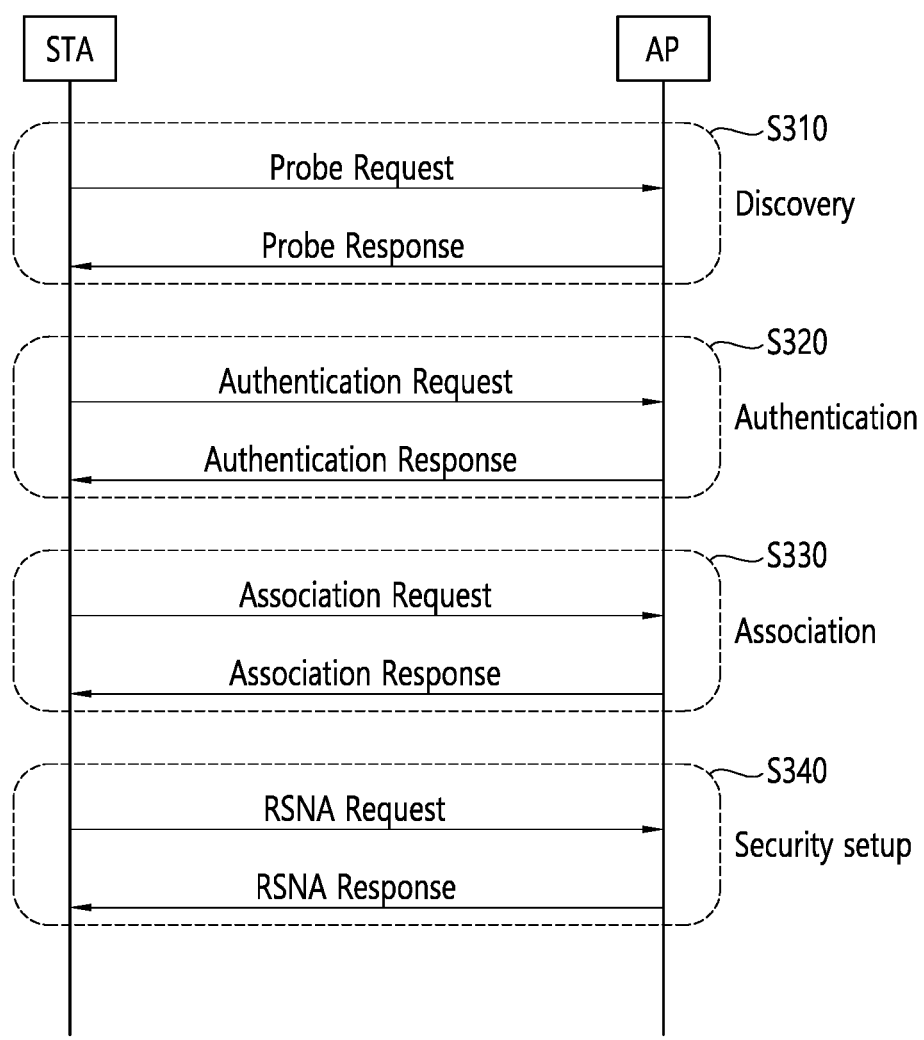
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
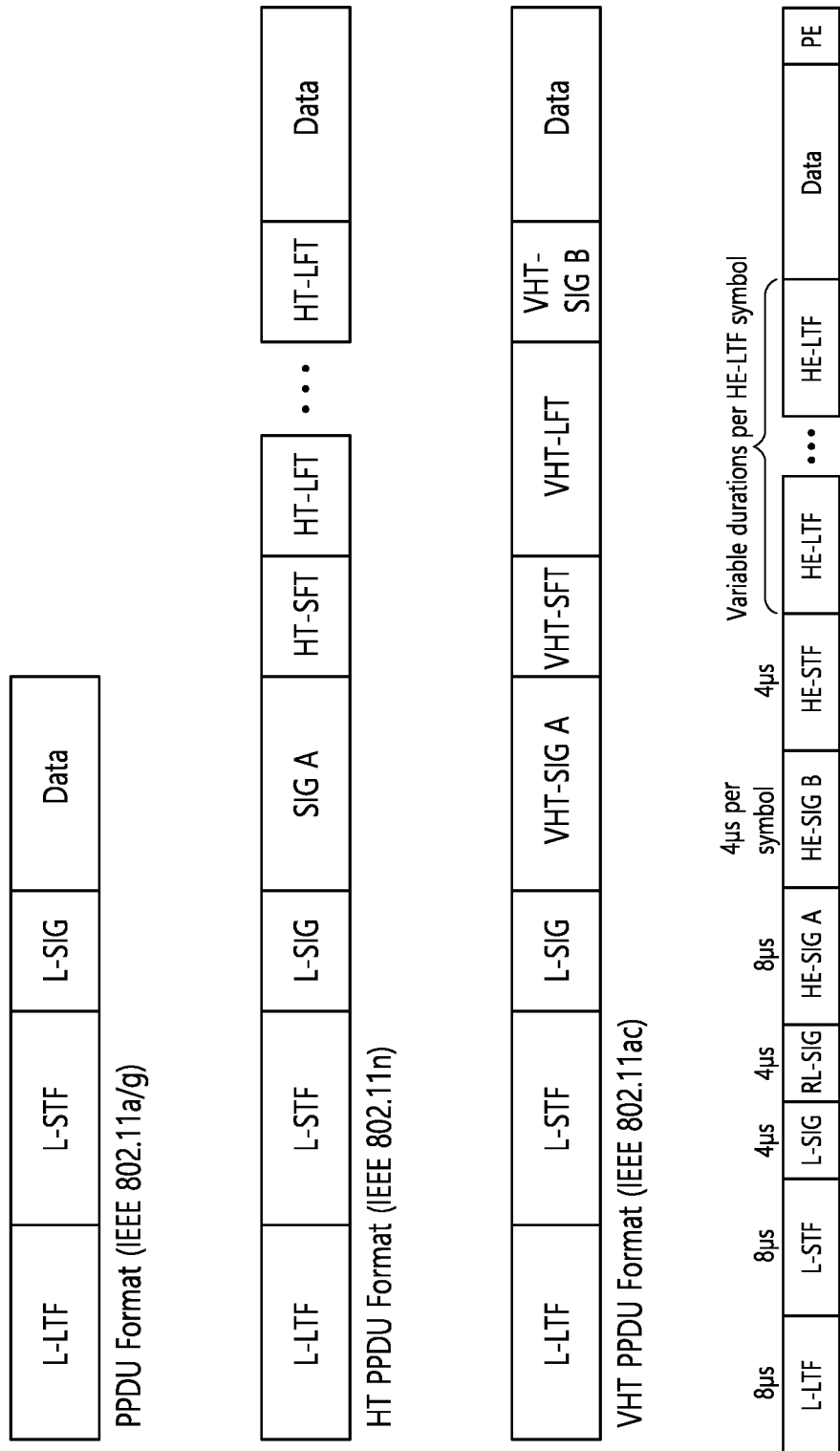
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
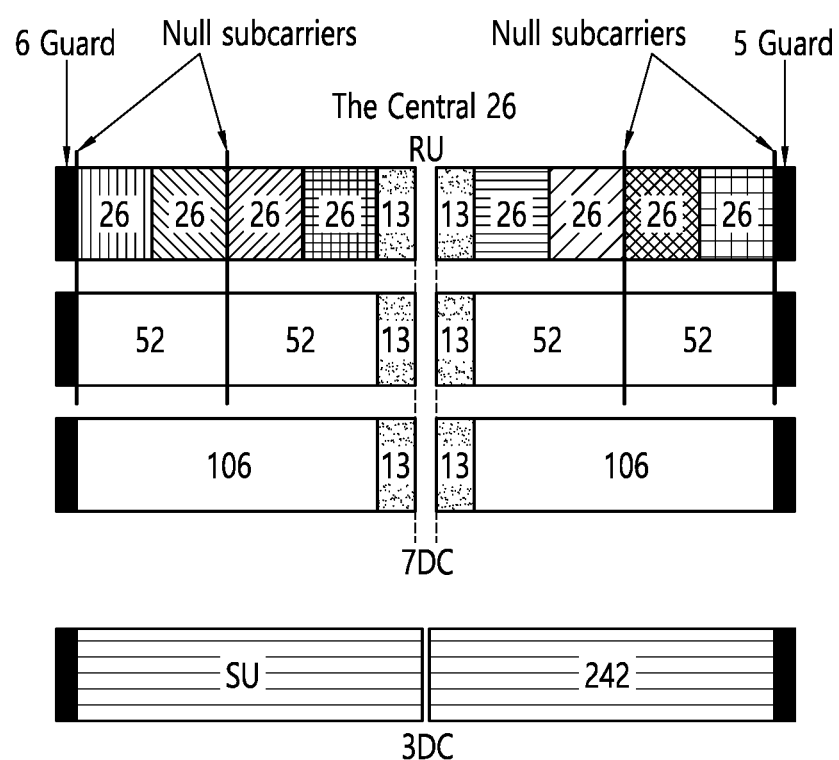
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
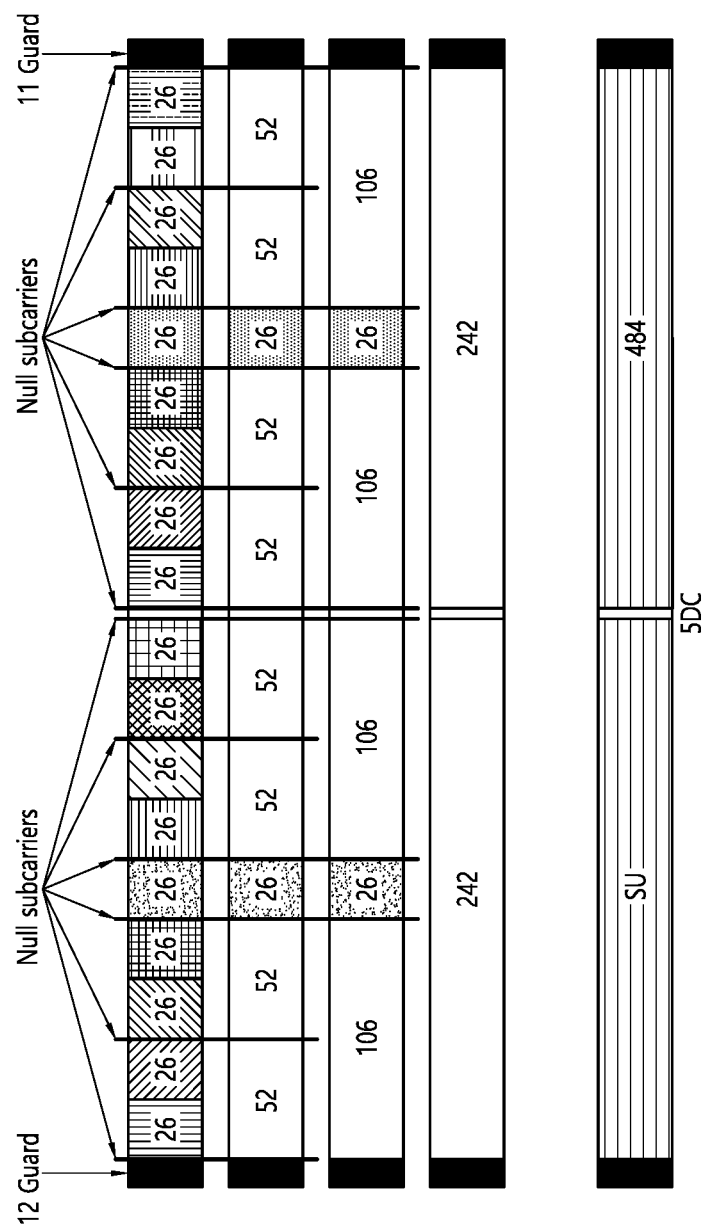
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
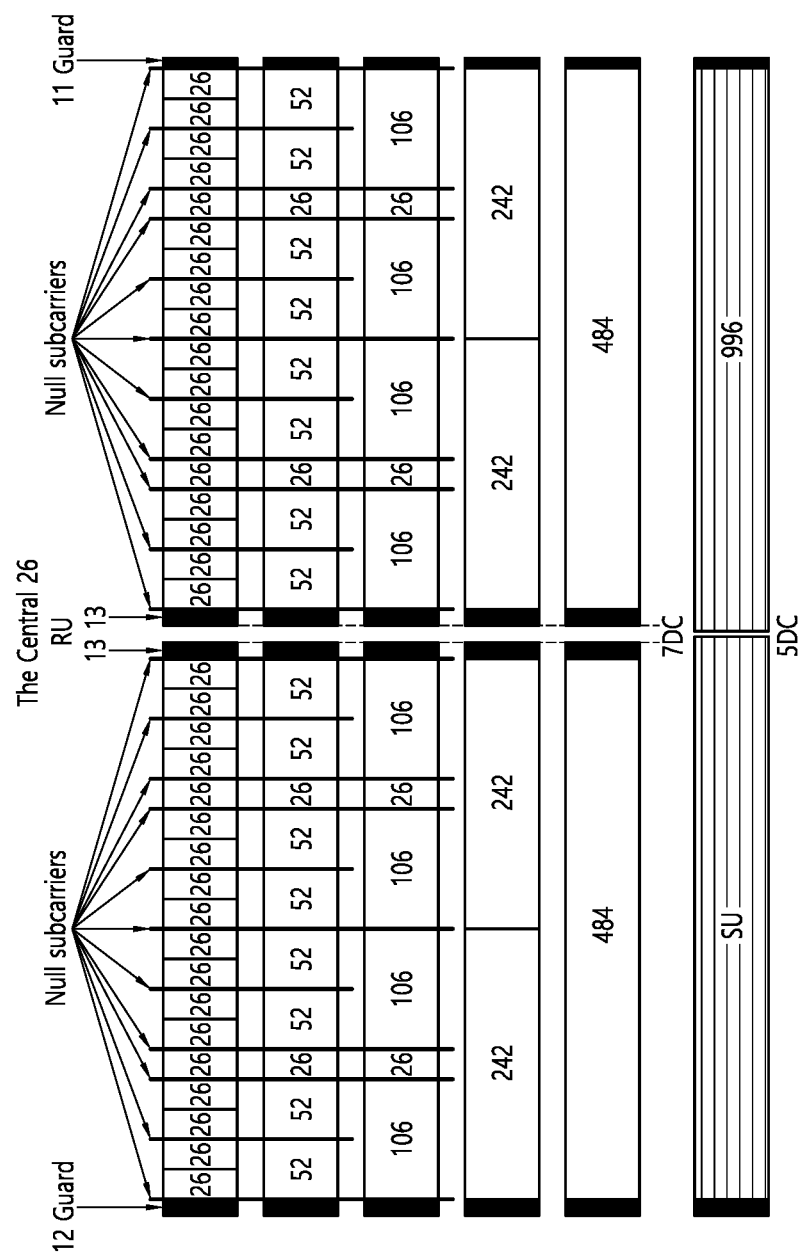
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
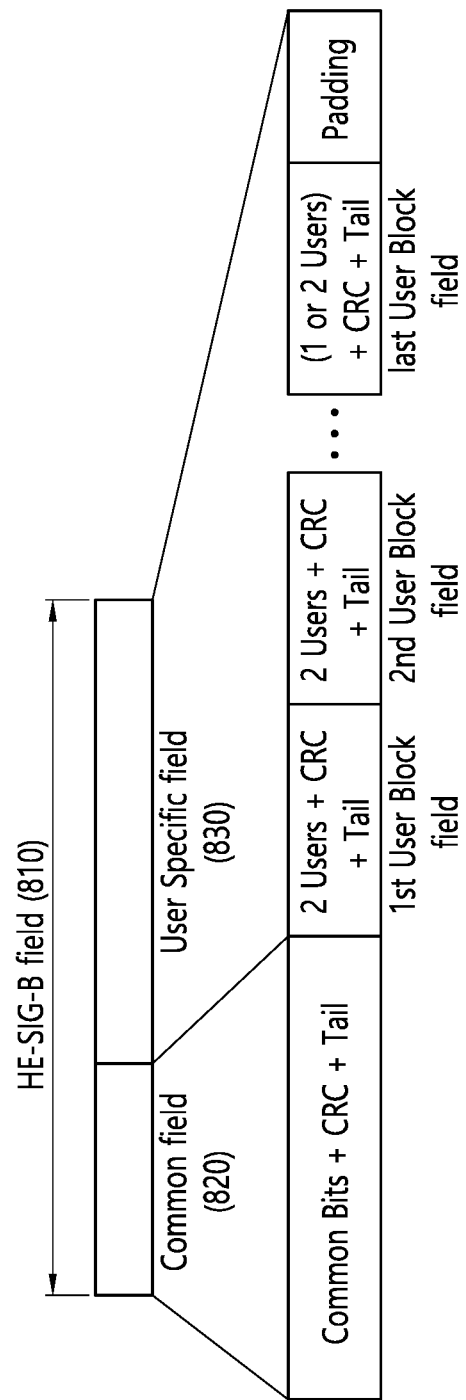
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |    | 1 |
| 00000010 | 26 | 26 | 26 | 26 | 26 | 52 |    | 26 | 26 | 1 |
| 00000011 | 26 | 26 | 26 | 26 | 26 | 52 |    | 52 |    | 1 |
| 00000100 | 26 | 26 | 52 |    | 26 | 26 | 26 | 26 | 26 | 1 |
| 00000101 | 26 | 26 | 52 |    | 26 | 26 | 26 | 52 |    | 1 |
| 00000110 | 26 | 26 | 52 |    | 26 | 52 |    | 26 | 26 | 1 |
| 00000111 | 26 | 26 | 52 |    | 26 | 52 |    | 52 |    | 1 |
| 00001000 | 52 |    | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 |   |   |   | 26 | 26 | 26 | 26 | 26 | 8 |
| 01001$y_2y_1y_0$ | 106 |   |   |   | 26 | 26 | 26 | 52 |    | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
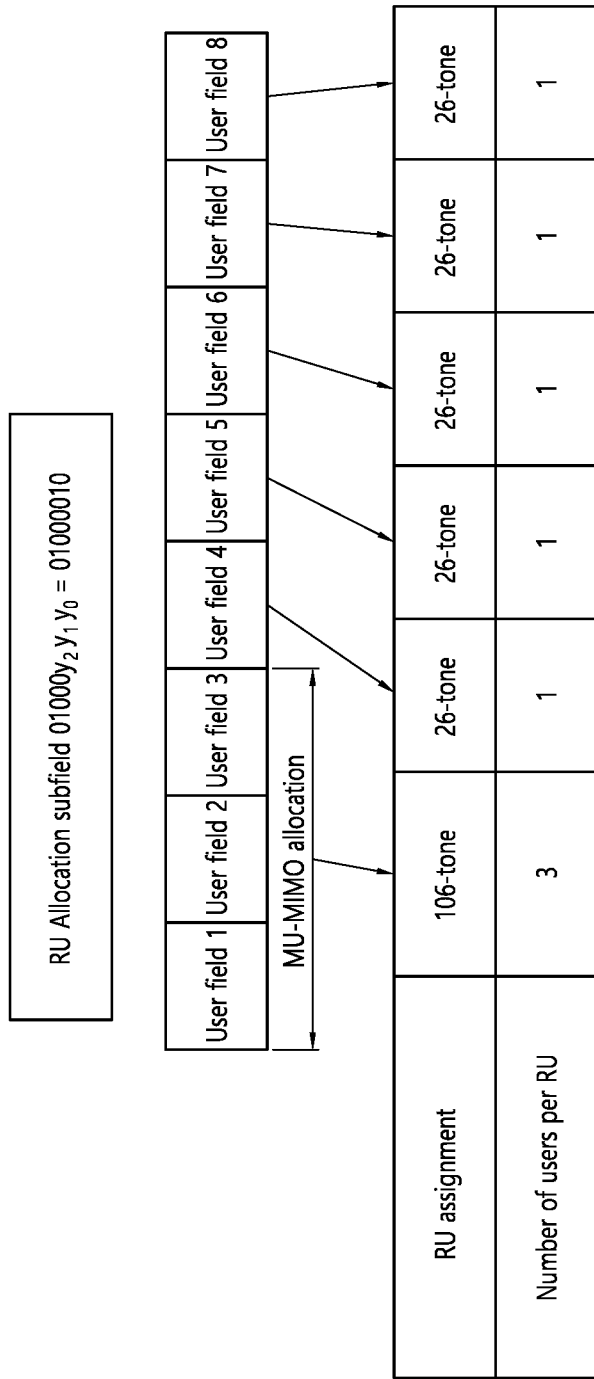
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

45

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
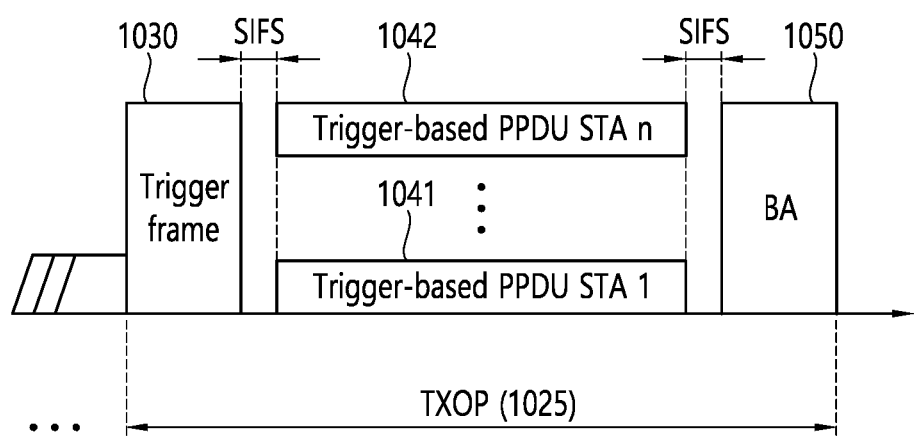
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
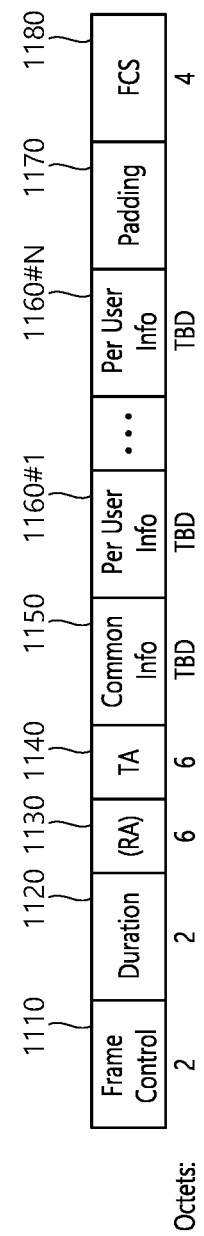
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
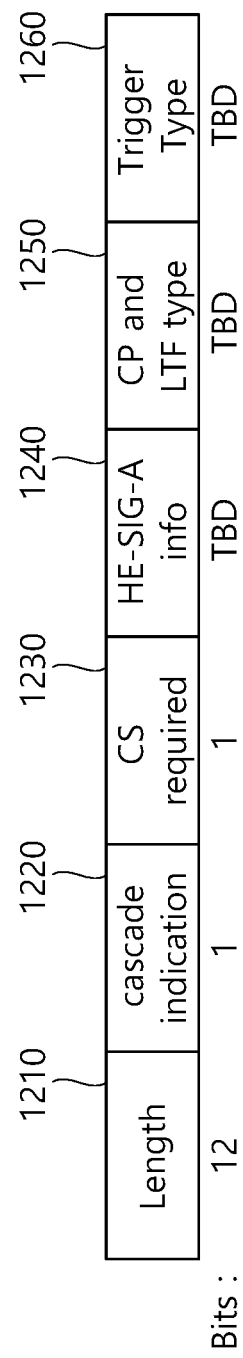
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
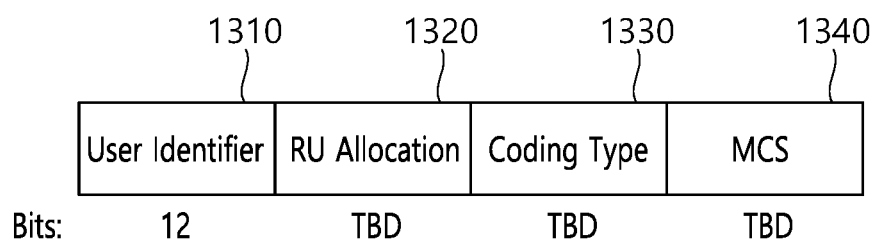
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
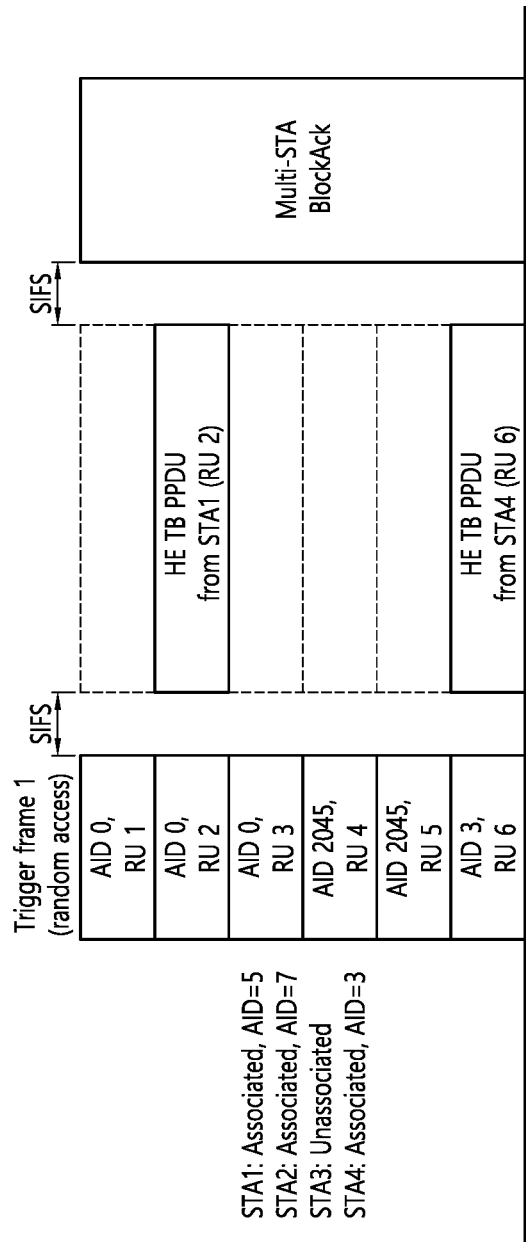
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
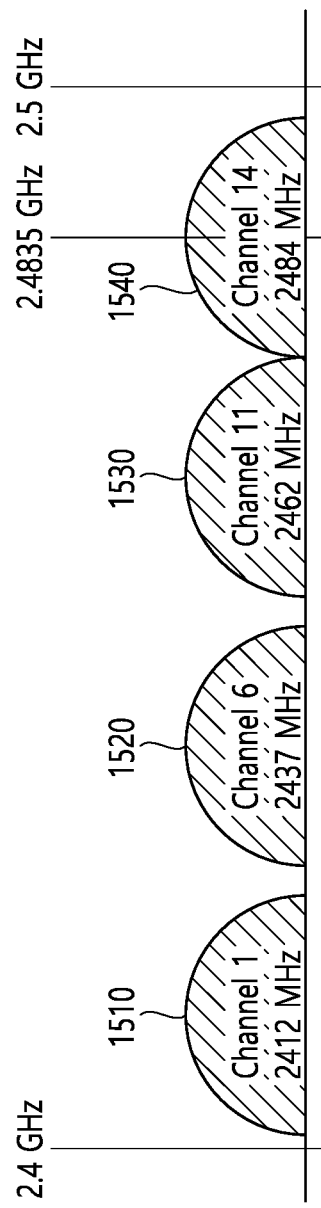
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
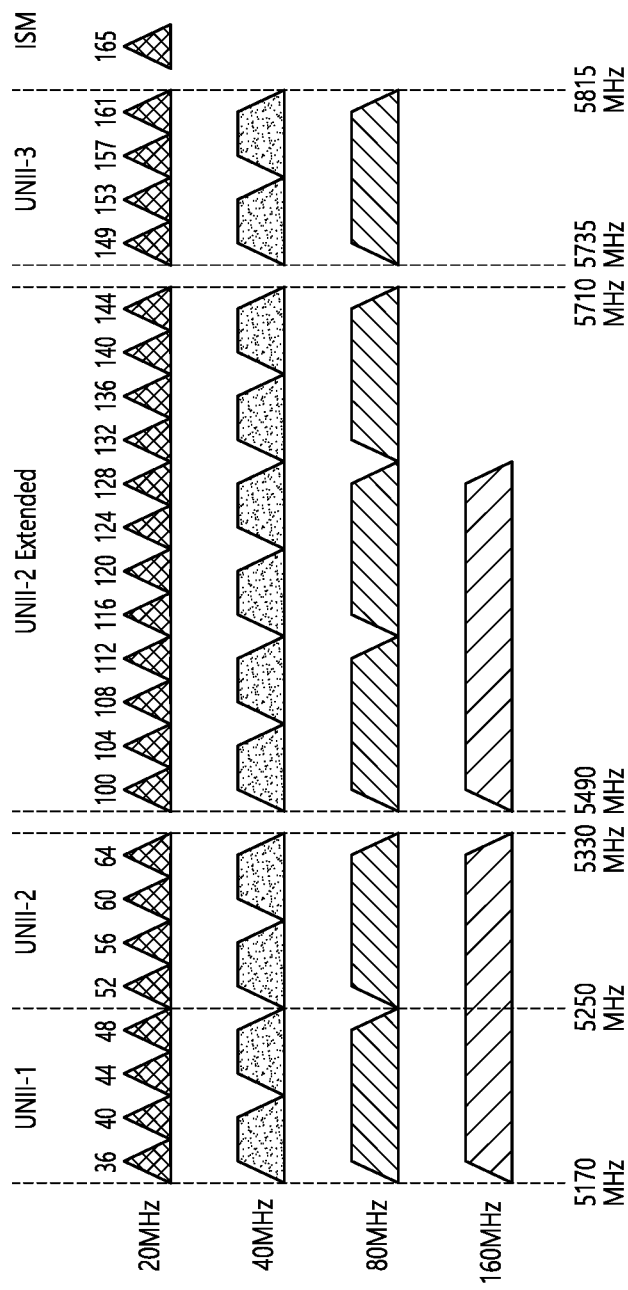
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
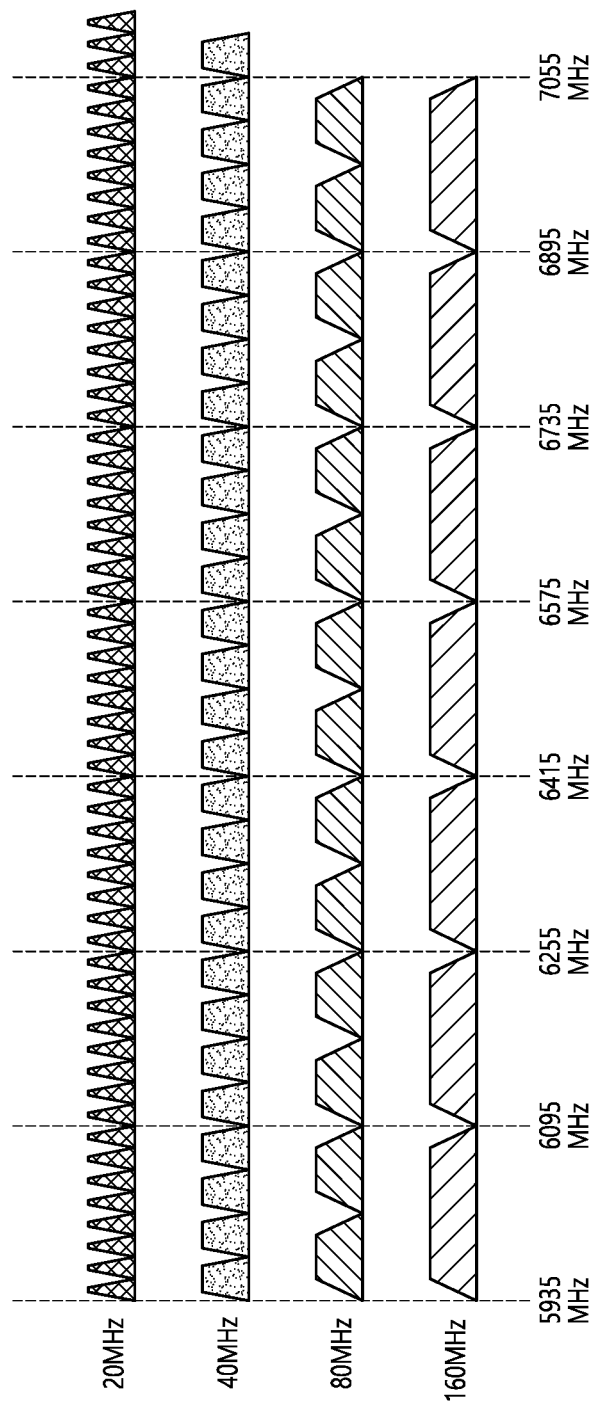
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may represent some or all of the PPDU types used in the EHT system. For example, the example of FIG. 18 may be used for both a single-user (SU) mode and a multi-user (MU) mode, or may be used only for the SU mode, or may be used only for the MU mode. For example, a trigger-based PPDU (TB) on the EHT system may be separately defined or configured based on the example of FIG. 18. The trigger frame described through at least one of FIGS. 10 to 14 and the UL-MU operation (e.g., the TB PPDU transmission operation) started by the trigger frame may be directly applied to the EHT system.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTF and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU.

For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information related to whether a dual subcarrier modulation (DCM) scheme is applied to EHT-SIG; 4) a field including information related to the number of symbol used for EHT-SIG; 5) a field including information related to whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include the technical feature of the HE-SIG-B shown in the examples of FIGS. 8 to 9 as it is. The EHT-SIG may be referred to by various names such as a second SIG field, a second SIG, a second type SIG, a control signal, a control signal field, and a second (type) control signal.

The EHT-SIG may include N-bit information (e.g., 1-bit information) regarding whether the EHT-PPDU supports the SU mode or the MU mode.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8p, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6p, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$M=\{-1-1,-1,-1,1,1,1,-1,1,1,1,-1,1,1,-1,1\}$ <Equation 1>

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

EHT-STF(−112:16:112)={$M$}*(1+$j$)/sqrt(2)

EHT-STF(0)=0 <Equation 2>

The EHT-STF for the 40 MHz PPDU may be configured based on the following equation. The following example may be the first type (i.e., 1×STF) sequence.

EHT-STF(−240:16:240)={$M$,0,−$M$}*(1+$j$)/sqrt(2) <Equation 3>

The EHT-STF for the 80 MHz PPDU may be configured based on the following equation. The following example may be the first type (i.e., 1×STF) sequence.

EHT-STF(−496:16:496)={$M$,1,−$M$,0,−$M$,1,−$M$}*(1+$j$)/sqrt(2) <Equation 4>

The EHT-STF for the 160 MHz PPDU may be configured based on the following equation. The following example may be the first type (i.e., 1×STF) sequence.

EHT-STF(−1008:16:1008)={$M$,1,−$M$,0,−$M$,1,−$M$,0,−$M$,−1,$M$,0,−$M$,1,−$M$}*(1+$j$)/sqrt(2) <Equation 5>

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

EHT-STF(−496:16:496)={−$M$,−1,$M$,0,−$M$,1,—$M$}*(1+$j$)/sqrt(2) <Equation 6>

Equation 7 to Equation 11 below relate to an example of a second type (i.e., 2$x$ STF) sequence.

EHT-STF(−120:8:120)={$M$,0,−$M$}*(1+$j$)/sqrt(2) <Equation 7>

The EHT-STF for the 40 MHz PPDU may be configured based on the following equation.

EHT-STF(−248:8:248)={$M$,−1,−$M$,0,$M$,−1,$M$}*(1+$j$)/sqrt(2)

EHT-STF(−248)=0

EHT-STF(248)=0 <Equation 8>

The EHT-STF for the 80 MHz PPDU may be configured based on the following equation.

EHT-STF(−504:8:504)={$M$,−1,$M$,−1,−$M$,−1,$M$,0,−$M$,1,$M$,1,−$M$,1,−$M$}*(1+$j$)/sqrt(2) <Equation 9>

The EHT-STF for the 160 MHz PPDU may be configured based on the following equation.

EHT-STF(−1016:16:1016)={$M$,−1,$M$,−1,−$M$,−1,$M$,0,−$M$,1,$M$,1,−$M$,1,−$M$,0, −$M$,1,−$M$,1,$M$,1,−$M$,0,−$M$,1,$M$,1,−$M$,1,−$M$}*(1+$j$)/sqrt(2)

EHT-STF(−8)=0,EHT-STF(8)=0,

EHT-STF(−1016)=0,EHT-STF(1016)=0 <Equation 10>

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

EHT-STF(−504:8:504)={−$M$,1,−$M$,1,$M$,1,−$M$,0,−$M$,1, $M$,1,−$M$,1,−$M$}*(1+$j$)/sqrt(2)

EHT-STF(−504)=0,

EHT-STF(504)=0 <Equation 11>

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frames, the management frame, and the data frame.

Figure 19:
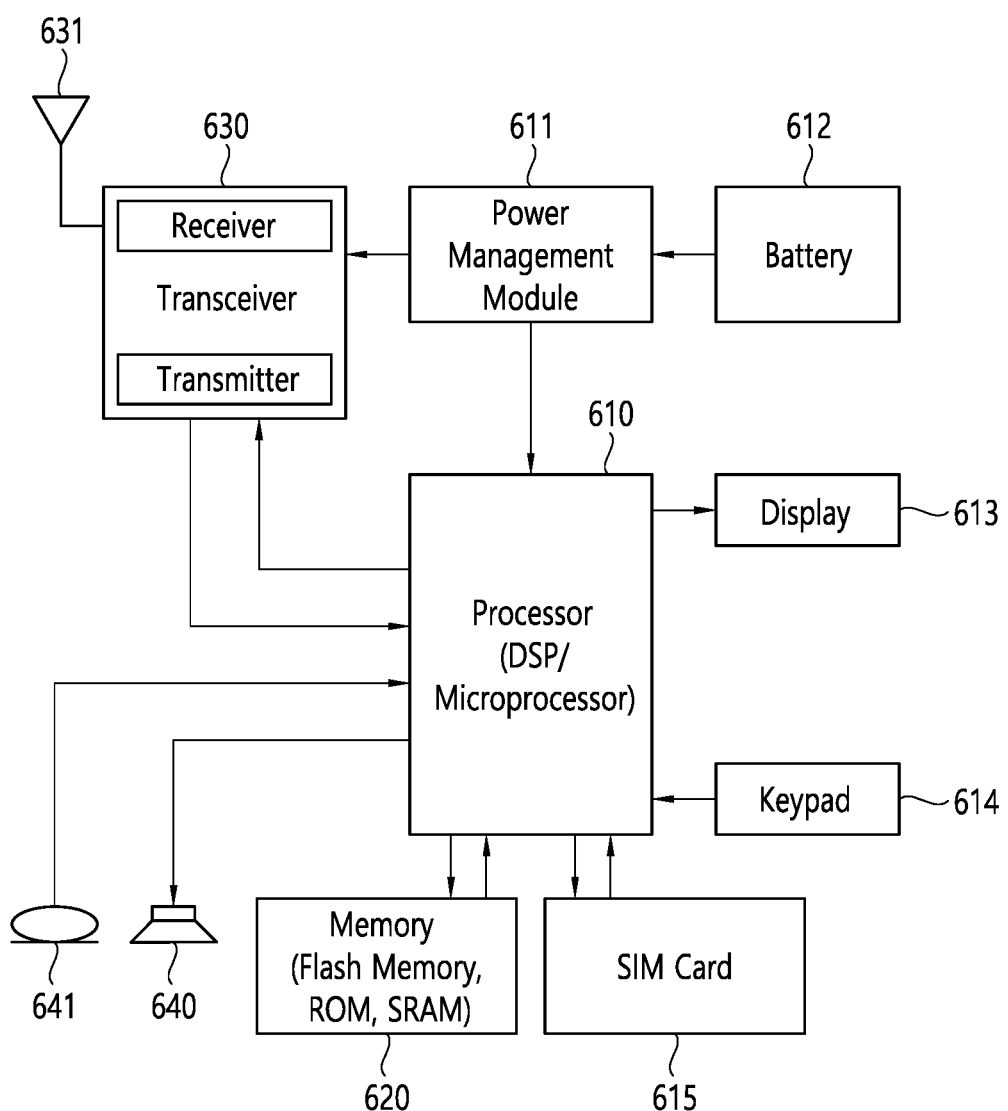
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

In the following specification, an EHT standard or a PPDU based on the EHT standard may be described.

In order to provide a higher data rate than the 802.11ax standard, the EHT standard may be proposed. The EHT standard may support a wide bandwidth (e.g., a bandwidth of 320 MHz or more), 16 streams, and/or multi-link (or multi-band) operation. Therefore, to support a transmission method based on the EHT standard, a new frame format may be used. When transmitting a signal through 2.4/5/6 GHz band using the new frame format, conventional Wi-Fi receivers or STAs (e.g., receivers compliant with 802.11n/ac/ax standard) as well as a receiver supporting the EHT standard may also receive an EHT signal (e.g., a Wake-Up Radio (WUR) signal) transmitted through the 2.4/5/6 GHz band.

The preamble of the PPDU based on the EHT standard may be set in various ways. Hereinafter, an embodiment of configuring a preamble of a PPDU based on the EHT standard may be described. In addition, an embodiment in which packet indication is performed through a preamble of a PPDU based on the EHT standard may be described together. Hereinafter, a PPDU based on the EHT standard may be described as an EHT PPDU. However, the EHT PPDU is not limited to the EHT standard. The EHT PPDU may include not only the 802.11be standard (i.e., the EHT standard), but also a PPDU based on a new standard that is an improvement/evolution/extension of the 802.11be standard.

Specifically, based on the configuration of the EHT PPDU, the first embodiment and the second embodiment may be proposed.

First Embodiment

According to an embodiment, by using the information bit for the Packet (or PPDU), the PPDU indication for the 802.11be standard (i.e., the EHT standard) and a next standard defined after the 802.11be standard (i.e., the future Wi-Fi) can be performed. In this case, the receiving STA can know information related to the packet after decoding the information bit in the packet is finished. When decoding the information bit is performed early, the receiving STA may check early whether the received PPDU is a PPDU configured based on a standard supported by the receiving STA.

Therefore, according to the first embodiment, in order to perform packet indication quickly (or early), in the EHT PPDU, a control field including an information bit may be proposed.

According to an embodiment, a frame (i.e., EHT PPDU) format for supporting the EHT standard may be set in various ways. For example, a frame format of the 802.11ax standard may be used as a frame format for supporting the EHT standard. As an example, a frame for supporting the EHT standard may comprise an L-part and an EHT-part. An example of a frame (hereinafter, EHT PPDU) for supporting the EHT standard may be described with reference to FIG. 20.

Figure 20:
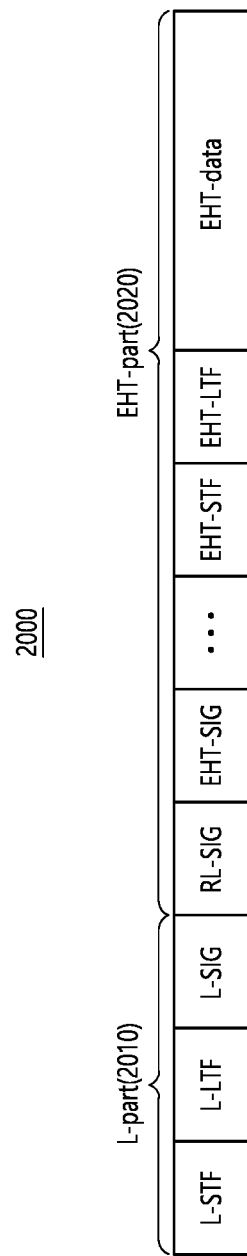
FIG. 20 shows an example of an EHT PPDU.

FIG. 20 shows an example of an EHT PPDU.

Referring to FIG. 20, the EHT PPDU 2000 may be configured by using a frame of a PPDU based on the 802.11ax standard. The EHT PPDU 2000 may include an L-part 2010 and an EHT-part 2020.

The EHT PPDU 2000 may be configured based on a structure in which the L-part 2010 is first transmitted before the EHT-part 2020 for coexistence with the legacy STA (e.g., STA compliant with the 802.11n/ac/ax standard).

According to an embodiment, the EHT part 2020 may include a RL-SIG, an EHT control field (e.g., U-SIG (not shown) and/or EHT-SIG), an EHT-STF, an EHT-LTF, and an EHT-data field in the same way as the frame format configured based on the 802.11ax standard.

According to an embodiment, the RL-SIG may be omitted in the EHT part 2020. That is, the EHT part 2020 may include an EHT control field (e.g., U-SIG (not shown) and/or EHT-SIG), EHT-STF, EHT-LTF, and EHT-data fields.

According to an embodiment, the EHT-SIG may include EHT-SIG-A including common control information and EHT-SIG-B including user specific information.

When a signal is transmitted based on the EHT frame configured as described above, information bits (e.g., fixed information bits or PHY identifier) for packet indication for the EHT PPDU may be included in the EHT-SIG for transmission. Therefore, in order to quickly perform packet indication for the EHT PPDU, the EHT control field may be variously configured. Hereinafter, a specific example of the configuration of the EHT control field may be described. For example, a specific example of EHT-SIG-A including common control information may be described below.

First Example of EHT-SIG-A Configuration

According to an embodiment, the EHT-SIG-A may include a field formed/configured with only a packet indication bit. An example of the EHT-SIG-A may be described with reference to FIG. 21.

Figure 21:
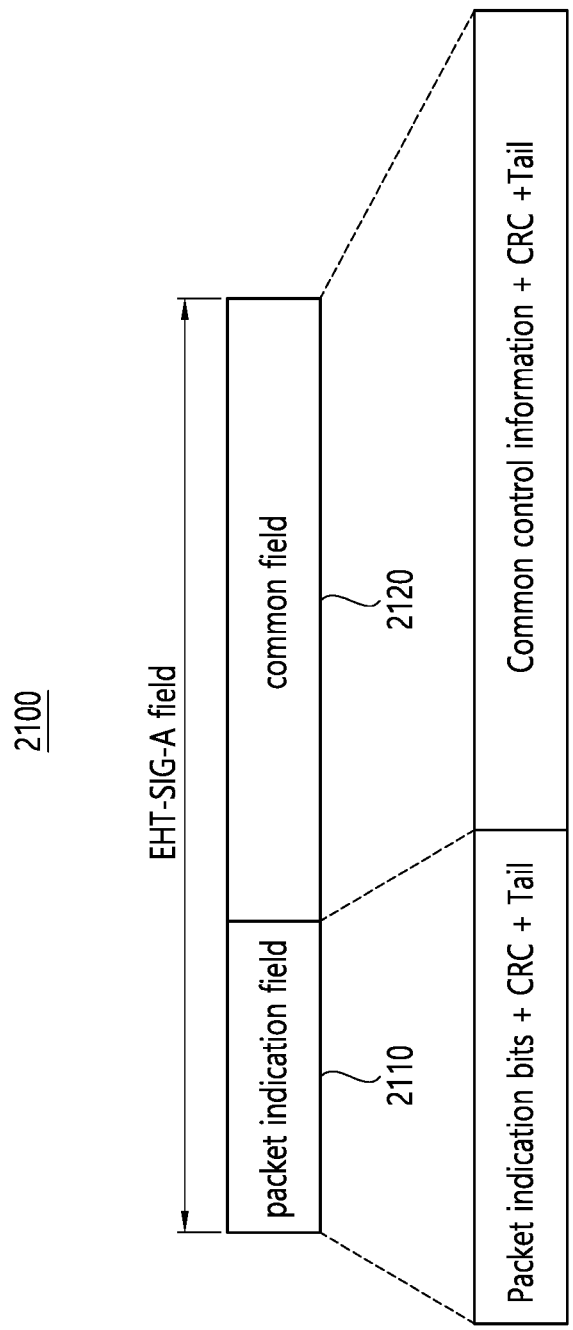
FIG. 21 shows an example of EHT-SIG-A.

FIG. 21 shows an example of EHT-SIG-A.

Referring to FIG. 21, the EHT-SIG-A 2100 may include a packet indication field 2110 and a common field 2120.

For example, the packet indication field 2110 may include packet indication bits, CRC bits, and tail bits. The common field 2120 may include Common control information, CRC bits, and Tail bits.

To support an early indication for the EHT PPDU, fast decoding of the packet indication bit may be required. Therefore, for fast decoding, packet indication bits (e.g., PHY identifier) may be individually/separately encoded for configuration of the EHT PPDU. Hereinafter, the encoding block for the packet indication field 2110 may be referred to as a packet indication block.

The packet indication block may include a variety of information. A specific example of information of the packet indication block may be described below.

Case 1: Case in which the Packet Indication Block Consists of Only Packet Indication Bits In Case 1, the packet indication block may include Packet indication bits, CRC bits, and Tail bits.

For example, the Packet indication bits may be set to one of 2 to 4 bits. The Packet indication bits may include information (or indication information) related to an EHT PPDU that is an PPDU being configured based on an EHT standard and an PPDU (i.e., the next Wi-Fi PPDU) being configured based on a next generation standard defined after EHT standard. In other words, the Packet indication bits may include information related to the version of the PPDU. As an example, the Packet indication bits may include information for distinguishing the PPDU according to the EHT standard and the standard determined (or generated/established) after the EHT standard.

For example, the CRC bits may be set to 4 bits. For example, the Tail bits may be set to 6 bits.

In Case 1, the packet indication block may consist of only a packet indication bit, CRC (or CRC bits) and/or tail bits. In addition, the packet indication block may be configured by individual/separate BCC encoding.

Case 2: Case in which the Packet Indication Block Consists of a Packet Indication Bit and Other Information In Case 2, the packet indication block may further include additional information to the information included in the packet indication block of Case 1. That is, the packet indication block may include packet indication bits, CRC bits, tail bits, and additional information. For example, the additional information may include information for an Early indication. For example, the additional information may include at least one of information related to BSS color, information related to TXOP, and/or a frame format indication bit.

For example, the Packet indication bits may be set to one of 2 to 4 bits. The Packet indication bits may include information (or indication information) related to an EHT PPDU that is an PPDU being configured based on an EHT standard and an PPDU (i.e., the next Wi-Fi PPDU) being configured based on a next generation standard defined after EHT standard.

For example, the information (or information field) related to the BSS color may include information related to the identifier of the BSS. The information related to the BSS color may be set to 6 bits.

For example, the TXOP-related information (or information field) may include time duration information for NAV configuration and TXOP protection. The information related to TXOP may be set to 7 bits.

The bit size for the BSS color and TXOP is only one example, and the information related to the BSS color and TXOP may have a bit size 1 or 2 bits larger than the above in order to transmit more information.

For example, the Frame format indication bit may include information for distinguishing the EHT PPDU format. As an example, the EHT PPDU format may include a SU/MU/TB/ER PPDU. The frame format indication bit may be set to 1 or 2 bits.

For example, when using 1 bit, it can be used to distinguish between the MU (Multiple-User) and the TB (Trigger-Based).

For example, the CRC bits may be set to 4 bits. For example, the Tail bits may be set to 6 bits.

In Case 2, the packet indication block may consist of a packet indication bit, information for Early indication, CRC (or CRC bits) and/or tail bits. In addition, the packet indication block may be configured by individual/separate BCC encoding.

According to an embodiment, in Case 1 and Case 2 described above, CRC bits of 2 or 3 bits may be used as CRC bits included for valid check in order to reduce overhead. In other words, the CRC bits may be set to 2 or 3 bits. According to an embodiment, a parity bit of 1 bit may be included in the EHT-SIG-A instead of the CRC bits.

As shown in FIG. 21, the EHT-SIG-A may consist of two encoding blocks. For example, the EHT-SIG-A (or EHT-SIG-A symbol) may include a common field including common control information and a packet indication field. The EHT-SIG-A may be configured to be a fixed number of symbols regardless of PPDU. As an example, the EHT-SIG-A may be configured/configured to be 3 or 4 symbols. When the EHT-SIG-A consists of 3 symbols, an example of the EHT-SIG-A may be described with reference to FIG. 22.

Figure 22:
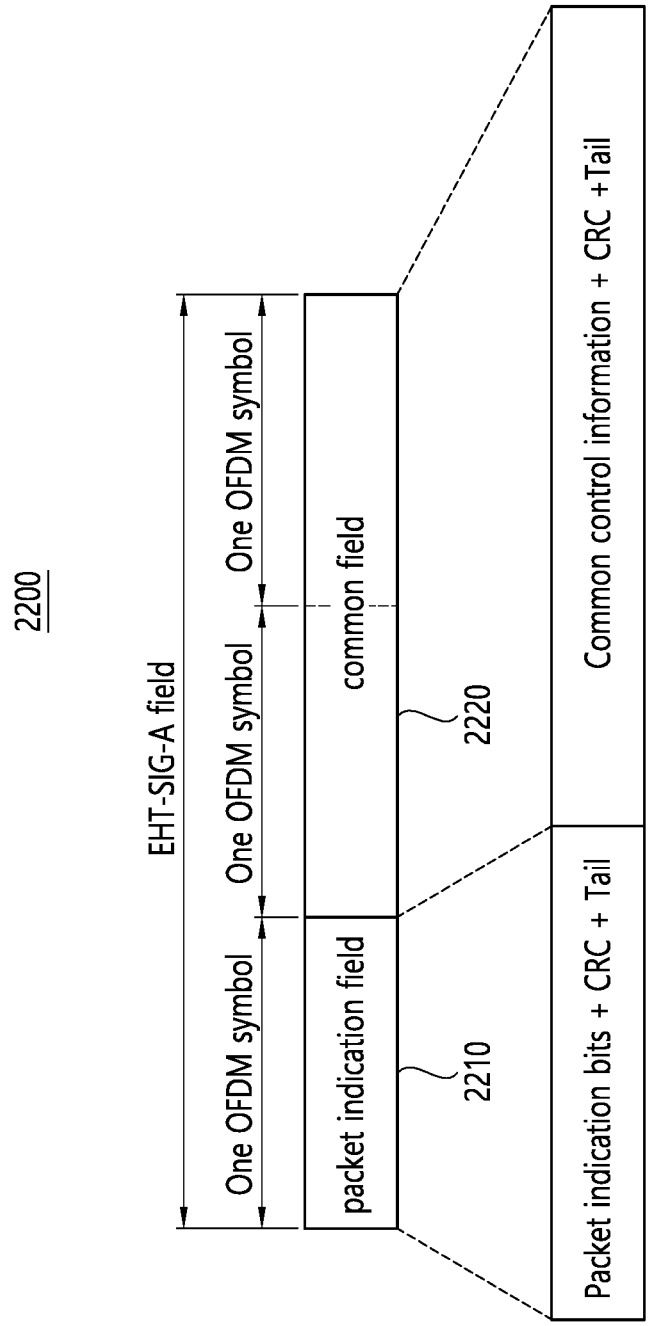
FIG. 22 shows an example of EHT-SIG-A.

FIG. 22 shows an example of EHT-SIG-A.

Referring to FIG. 22, the EHT-SIG-A 2200 may consist of three symbols. For example, the packet indication field 2210 may consist of one symbol. The common field 2220 may consist of two symbols.

For example, an encoding block including a packet indication bit may be included in the EHT-SIG-A. Accordingly, the EHT STA (or the receiving STA) may decode only the packet indication field 2210 of the EHT-SIG received after the RL-SIG. The EHT STA may quickly classify the received packet based on the packet indication field 2210.

Unlike the EHT PPDU shown in FIG. 20, the EHT PPDU may be variously configured. Another example of the EHT PPDU may be described with reference to FIG. 23.

FIG. 23 shows another example of an EHT PPDU.

Referring to FIG. 23, in the preamble of the EHT PPDU 2300, the EHT-SIG may be configured after the L-SIG. Based on the EHT-SIG of the EHT PPDU 2300, the indication for the 11be packet (i.e., the PPDU of the EHT standard) may be performed quickly.

The EHT PPDU 2300 may include an L-preamble (legacy-preamble) for coexistence with legacy. In addition, in the EHT PPDU 2300, a preamble may be configured such that the EHT-SIG is placed after the L-SIG. In this case, the EHT-SIG may be composed of a field including a packet identifier for early indication of packet indication information of the EHT standard and a field including common control information. For example, the EHT-SIG may be configured and transmitted as shown in FIG. 21.

In the present specification, an example in which packet indication bits (e.g., PHY identifier) is included in the EHT-SIG-A and transmitted has been described, but is not limited thereto. For example, even when the packet indication bit is transmitted using fields or symbols other than the EHT-SIG-A, the packet indication bit for early indication may be configured as an individual encoding block and transmitted. For example, the EHT-SIG-A configured as described above may be modulated based on BPSK.

Second Example EHT-SIG-A Configuration

Unlike the above-described example, the EHT-SIG may be configured by encoding in units of 2 symbols similar to the HE-SIG-A of the 802.11ax standard. In addition, the EHT-SIG may consist of a plurality of symbols. In this case, the CRC may be included for each encoding block. For example, when the EHT-SIG is configured to be 4 symbols, an example of the EHT-SIG may be described with reference to FIG. 24.

Figure 24:
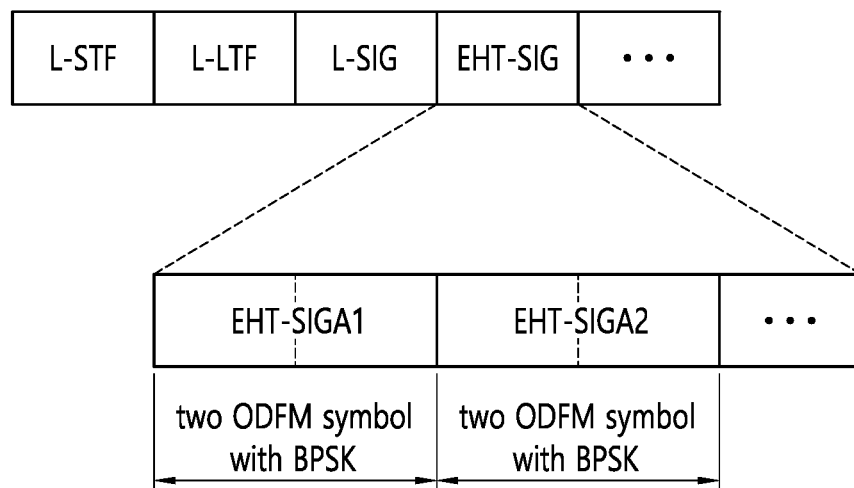
FIG. 24 shows an example of an EHT-SIG.

FIG. 24 shows an example of an EHT-SIG.

Referring to FIG. 24, the EHT-SIG-A may be encoded and transmitted in units of 2 symbols. Therefore, for the early indication for the packet indication, indication information may be included/transmitted in the first symbol among the symbols constituting the EHT-SIG-A. In this case, the EHT-SIG-A1 field may be configured in various ways. Hereinafter, an example in which the EHT-SIG-A1 field is configured may be described.

First Example of EHT-SIG-A1 Field

According to the first example of the EHT-SIG-A1 field, the EHT-SIG-A1 field may include an information bit for the packet indication and an information bit for the PPDU format. In the EHT-SIG-A1 field, the information bit for the packet indication may be transmitted initially/firstly. In addition, after the information bit for the packet indication, the information bit for the PPDU format may be transmitted. The EHT-SIG-A1 field may be configured as shown in Table 5.

TABLE 5

| Bit | Field | Number of bits |
| --- | --- | --- |
| $b_0$~$b_{n-1}$ (n = 2~4) | packet indication | 2~4 |
| $b_n$~$b_{n+1}$ | PPDU format | 2 |
| $b_{n+2}$~$b_{n+7}$ | BSS color | 6 |
| $b_{n+8}$~$b_{n+14}$ | TXOP | 7 |
| $b_{n+15}$~$b_{n+m+14}$ (m = 2~4) | BW | 2~4 |

Referring to Table 5, the EHT-SIG-A1 field may include various information. In Table 5, information up to $b_{n+m+14}$ has been described, but the EHT-SIG-A1 field may further include various information after $b_{n+m+14}$.

Second Example of EHT-SIG-A1 Field

According to the second example of the EHT-SIG-A1 field, in the EHT-SIG-A1 field, information for power saving (e.g., BSS, TXOP and BW) is transmitted first, and thereafter packet indication information can be transmitted. The EHT-SIG-A1 field may be configured as shown in Table 6.

TABLE 6

| Bit | Field | Number of bits |
|---|---|---|
| $b_0$~$b_5$ | BSS color | 6 |
| $b_6$~$b_{12}$ | TXOP | 7 |
| $b_{13}$~$b_{m+12}$ (m = 2~4) | BW | 2~4 |
| $b_{m+13}$~$b_{n+m+12}$ (n = 2-4) | packet indication | 2~4 |
| $B_{n+m+13}$~$b_{n+m+14}$ | PPDU format | 2 |

Referring to Table 6, the EHT-SIG-A1 field may include various information. In Table 6, information up to $b_{n+m+14}$ has been described, but the EHT-SIG-A1 field may further include various information after $b_{n+m+14}$. Unlike the configuration of the EHT-SIG-A1 field of Table 6, according to an embodiment, information related to BW may be transmitted before information related to TXOP.

In the configuration of the above-described EHT-SIG-A1 field, the indication for the PPDU format may be variously changed. For example, when the PPDU format is indicated using a result value of the "mod 3 operation" to the length field as in the 802.11ax standard, in the SU PPDU, 1 bit may be allocated/configured for the indication of the PPDU format. In the MU PPDU, the indication for the PPDU format may be omitted.

Third Example of EHT-SIG-A Configuration

According to the third example of the EHT-SIG-A1 field, by reusing the fields and field positions of the HE-SIG-A, the EHT-SIG-A may be configured. The EHT-SIG field may be placed in a position of EHT-SIG-A1 transmitted at the beginning/foremost within EHT-SIG-A of FIG. 24. In addition, by reusing some fields and positions of HE-SIG-A according to the 802.11ax standard, it may be configured as follows.
(1) First Configuration
(1)-A. First Symbol
  i. b_0~b_n−1: Packet indication bit, n=2-4
  ii. . . .
  iii. b_8~b_13: BSS Color (6 bit)
  iv. . . .
(1)-B. Second Symbol
  i. B_0~B_6: TXOP(7 bit)
  ii. . . .
Unlike the above configuration, only the order of the second coming TXOP is maintained, and other fields may be reconfigured.

Second Embodiment

Figure 25:
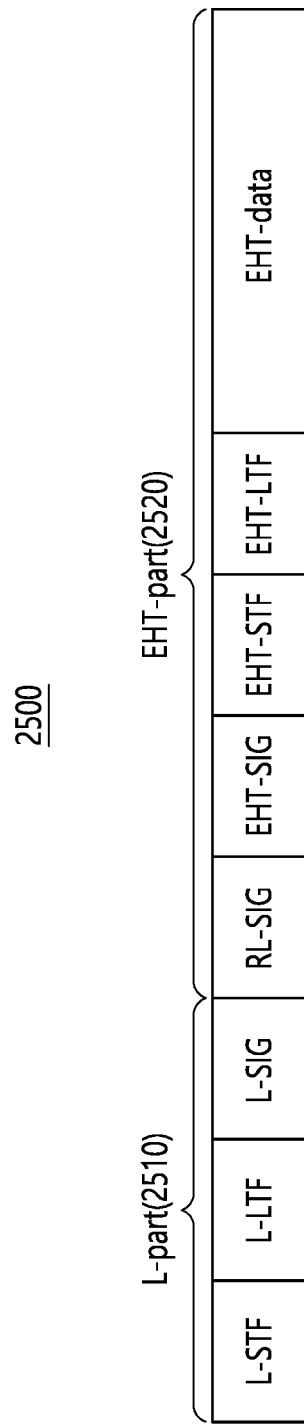
FIG. 25 shows an example of an EHT PPDU.

According to the second embodiment, a technical feature that reduces miss detection for PPDU of the legacy standard and indicates that it is an EHT PPDU may be proposed. In order to indicate that it is an EHT PPDU, the EHT PPDU may be configured in the structure of FIGS. 25 and 26.
FIG. 25 shows an example of an EHT PPDU.

Referring to FIG. 25, the EHT PPDU 2500 may be configured by using a frame of a PPDU based on the 802.11ax standard. The EHT PPDU 2500 may include an L-part 2510 and an EHT-part 2520.

The EHT PPDU 2500 may be configured based on a structure in which the L-part 2510 is transmitted first before the EHT-part 2520 for coexistence with the legacy STA (STA operating based on the 802.11n/ac/ax standard).

According to an embodiment, the EHT part 2520 may include RL-SIG, EHT control field (e.g., U-SIG (not shown) and/or EHT-SIG), EHT-, like a frame format according to the 802.11ax standard. It may include STF, EHT-LTF and EHT-data fields.

The EHT PPDU 2500 may include the RL-SIG for reliability and range extension of the L-SIG like the 802.11ax PPDU (i.e., the 11ax PPDU).

According to an embodiment, the EHT PPDU 2500 may be configured with an RL-SIG, an EHT control field, and an EHT data field similar to the frame format of the 802.11ax standard. According to an embodiment, the configuration of the EHT control field may be changed according to whether multiple-user communication is supported.
FIG. 26 shows an example of an EHT PPDU.

Referring to FIG. 26, the EHT PPDU 2600 may not include the RL-SIG, unlike the EHT PPDU 2500 illustrated in FIG. 25.

In the following specification, when the EHT PPDU is configured as shown in FIGS. 25 and 26, in order to reduce the false detection that legacy devices (e.g., 802.11n/11ac/11ax STAs) determine the EHT PPDU as their PPDU, the EHT PPDU (i.e., RL-SIG and EHT-SIG) may be configured as in Case 1 and Case 2 below.
Case 1: Case in which EHT PPDU Includes RL-SIG According to an embodiment, in the EHT PPDU, one symbol constituting each of the RL-SIG and the EHT-SIG may be modulated based on BPSK. Since the RL-SIG and the EHT-SIG are included in the EHT PPDU, it is possible to reduce miss detection in the 802.11n and/or 802.11ac standard STA.

For example, when the constellation of two symbols following L-SIG is QBPSK+QBPSK or BPSK+QBPSK, the 802.11n and/or 802.11ac STA (i.e., an 11n STA and/or an 11ac STA) may recognize the received PPDU as its own packet. Therefore, when the EHT PPDU is configured as described above, there is an effect of preventing miss-detection in the 11n STA and/or the 11ac STA. In other words, when the symbols constituting the RL-SIG and the EHT-SIG of the EHT PPDU are each modulated based on BPSK, there is an effect of preventing miss-detection in the 11n STA and/or the 11ac STA.

In addition, the 802.11ax STA (i.e., the 11ax STA) may first determine whether the L-SIG has been repeated. Thereafter, the 11ax STA may determine whether the received PPDU is an 11ax PPDU through a contents-check. Therefore, in order to prevent miss-detection in the 11ax STA, the contents of the EHT PPDU may be set as follows.
1. Set the value of the Length field included in L-SIG to a value that satisfies "mod 3=0"
1-A-i. Because the value of the Length field satisfies "mod 3=0" (that is, the result of the "modulo 3 operation" is 0), the 11ax STA that has received the EHT PPDU can know that the value of length is different from the set value of the 11ax standard based on the contents-check after the repetition check. Accordingly, when receiving the EHT PPDU, the 11ax STA may confirm that the received PPDU is not the 11ax PPDU.

In other words, the 11ax PPDU may be configured based on a structure in which the RL-SIG is repeated. Also, the value of the Length field of the 11ax PPDU may be set not to satisfy "mod 3=0". Therefore, in the 11ax STA, the EHT PPDU may pass the repetition check. However, in the 11ax STA, the EHT PPDU may not pass the content check of the L-SIG. When the 11ax STA receives the EHT PPDU, based on the above-described process, the 11ax STA may confirm that the received PPDU is not the 11ax PPDU.

1-A-ii. According to an embodiment, the 802.11ba standard PPDU (i.e., 11ba PPDU) may have a structure in which the L-SIG is repeated two more times. For example, the 11ba PPDU may include BPSK-Mark1 and BPSK-Mark2 in which the L-SIG is repeated. An 802.11ba standard STA (i.e., an 11ba STA) may perform repetition check twice. Therefore, the EHT PPDU may not pass the repetition checks twice in the 11ba STA. When receiving the EHT PPDU, the 11ba STA may confirm that the received PPDU is not the 11ba PPDU based on the above-described process.

1-B. If the value of the length field is "mod 3=0" after the RL-SIG repetition check and the L-SIG content check, the EHT STA may perform a repetition check once more for i) a symbol contiguous to the RL-SIG and ii) the RL-SIG. That is, the EHT STA may check whether the symbol contiguous to the RL-SIG is configured such that the RL-SIG is repeated. The EHT STA may determine whether the received PPDU is an EHT PPDU based on the repetition check of the i) a symbol contiguous to the L-SIG and ii) the RL-SIG.

1-B-i. According to an embodiment, when the EHT STA determines the repetition through the second repetition check, the EHT STA may recognize/determine the received PPDU as an 11ba PPDU.

1-B-ii. According to an embodiment, when the EHT STA fails in the second repetition check, it may recognize/determine the received PPDU as an EHT PPDU.

1-C. Unlike the above-mentioned 1-B, when the EHT STA confirms that the value of the length field is "mod 3=0" through the L-SIG contents check, the EHT STA can check a PPDU indication/packet indication information bit included in the EHT-SIG field (e.g., EHT-SIG-A) which may be contiguous to the RL-SIG. The EHT STA may determine whether the received PPDU is an EHT PPDU or not based on the PPDU indication/packet indication information bit.

1-C-i. The EHT-SIG may include various fields (or information). An example of a field included in the EHT-SIG may be described below.

1-C-i-a. The EHT-SIG may include a field (or, a Packet indication field) related to the Packet indication. The field related to the packet indication may be located at the beginning (e.g., the forefront) of the EHT-SIG and may indicate the type of PPDU. In other words, the field related to the packet indication may include information related to the type of the PPDU. The type of PPDU may include a PPDU based on the EHT standard or a PPDU (or PPDU type) based on a (future) standard being defined after the EHT standard. For example, the field related to the packet indication may be set to 2 to 4 bits.

For example, when the field related to the packet indication is set to 4 bits, each bit information may be set in various ways.

For example, when the field related to the packet indication is set to [0 0 0 0], the field related to the packet indication may indicate the EHT PPDU (or EHT packet).

For example, when the field related to the Packet indication is set to [0 0 0 1] to [1 1 1 1], the field related to the Packet indication may be reserved for a (future) standard being defined after the EHT standard.

1-C-i-b. The EHT-SIG may include a field (or, a format indication field) related to the format indication. The field related to the format indication may indicate the format of the PPDU. In other words, the field related to the format indication may include information related to the format of the PPDU. The format of the PPDU may include SU/MU/TB (Trigger Based) EHT PPDU (or PPDU format). For example, the field related to the format indication may be set to 1 to 2 bits.

For example, when the field related to the format indication is set to 2 bits, each bit information may be set in various ways. The field related to the format indication may indicate SU/MU/trigger based EHT PPDU. In other words, the field related to the format indication may include information related to the SU/MU/trigger based EHT PPDU.

For example, when the field related to the format indication is set to [0 0], the field related to the format indication may indicate (or represent) 'not-EHT PPDU' (or 'not-EHT packet').

For example, when the field related to the Format indication is set to [0 1], the field related to the Format indication may indicate (or represent) the SU EHT PPDU.

For example, when the field related to the Format indication is set to [1 0], the field related to the Format indication may indicate (or represent) the MU EHT PPDU.

For example, when the field related to the format indication is set to [1 1], the field related to the format indication may indicate (or represent) a TB (Trigger Based) EHT PPDU.

1-C-i-c. The EHT-SIG may include a field (or a BSS color field) related to the BSS color.

1-C-i-d. The EHT-SIG may include a TXOP-related field (or TXOP field).

1-C-i-e. The EHT-SIG may include a BW-related field (or BW field).

1-C-ii. According to an embodiment, for an early indication for the packet, the EHT-SIG may be configured such that the packet indication bit comes to the front of the EHT-SIG.

1-C-iii. According to an embodiment, contrary to the above-described embodiment, information (or fields) related to the BSS, BW, and TXOP may be sequentially located in front of the EHT-SIG for power saving. The EHT-SIG may be configured so that the packet indication bit is located after the information (or field) related to the BSS, BW and TXOP.

According to an embodiment, information (or fields) related to the BSS, TXOP, and BW may be sequentially (and/or contiguously) located in front of the EHT-SIG. The EHT-SIG may be configured so that the packet indication bit is located after the information (or field) related to the BSS, TXOP and BW.

1-D. As described above, when receiving the PPDU, the EHT STA may distinguish the EHT PPDU based on 3 steps.

1-D-i. For example, the EHT STA may distinguish the EHT PPDU based on the repetition check, the contents check (e.g., 'mod 3=0' check) and the repetition check.

1-D-ii. For example, the EHT STA may distinguish the EHT PPDU based on the repetition check, the contents check (e.g., 'mod 3=0' check) and the packet indication information check.

2. The value of the Length field included in the L-SIG can be set to a value that satisfies "mod 3 !=0" (the result of 'modulo 3 operation' is non-zero).

According to an embodiment, the value of the Length field of the L-SIG may be set to a value other than 0 as a result of the 'mod 3 operation'. That is, the Length field of the L-SIG may be configured in the same way as in the flax standard.

2-A. An information bit for packet indication may be included in the EHT-SIG following the RL-SIG and transmitted.

2-A-i. The EHT-SIG may include various fields. An example of a field included in the EHT-SIG may be described below.

2-A-i-a. EHT-SIG may include a field (or Packet indication field) related to the packet indication. The field related to the packet indication may indicate the type of the PPDU. In other words, the field related to the packet indication may include information related to the type of the PPDU. The type of PPDU may include a PPDU based on the EHT standard or a PPDU (or PPDU type) based on a (future) standard being defined after the EHT standard. For example, the field related to the packet indication may be set to 2 to 4 bits.

For example, when the field related to the packet indication is set to 4 bits, each bit information may be set in various ways.

For example, when the field related to the packet indication is set to [0 0 0 0], the field related to the packet indication may indicate the EHT PPDU (or EHT packet).

For example, when the field related to the Packet indication is set to [0 0 0 1] to [1 1 1 1], the field related to the Packet indication may be reserved for a (future) standard being defined after the EHT standard.

2-A-i-b. The EHT-SIG may include a field (or, a format indication field) related to the format indication. The field related to the format indication may indicate the format of the PPDU. In other words, the field related to the format indication may include information related to the format of the PPDU. The format of the PPDU may include SU/MU/TB (Trigger Based) EHT PPDU (or PPDU format). For example, the field related to the format indication may be set to 1 to 2 bits.

For example, when the field related to the format indication is set to 2 bits, each bit information may be set in various ways. The field related to the format indication may indicate SU/MU/trigger based EHT PPDU. In other words, the field related to the format indication may include information related to the SU/MU/trigger based EHT PPDU.

For example, when the field related to the format indication is set to [0 0], the field related to the format indication may indicate (or represent) 'not-EHT PPDU' (or 'not-EHT packet').

For example, when the field related to the Format indication is set to [0 1], the field related to the Format indication may indicate (or represent) the SU EHT PPDU.

For example, when the field related to the Format indication is set to [1 0], the field related to the Format indication may indicate (or represent) the MU EHT PPDU.

For example, when the field related to the format indication is set to [1 1], the field related to the format indication may indicate (or represent) a TB (Trigger Based) EHT PPDU.

2-A-i-c. The EHT-SIG may include a field (or a BSS color field) related to the BSS color.

2-A-i-d. The EHT-SIG may include a TXOP-related field (or TXOP field).

2-A-i-e. The EHT-SIG may include a BW-related field (or BW field).

2-A-ii. According to an embodiment, for an early indication for the packet, the EHT-SIG may be configured such that the packet indication bit comes to the front of the EHT-SIG.

2-A-iii. The above-described fields (or information) related to the BSS color, TXOP, etc. may be set to have the same bit order as SIG-A of the flax PPDU.

2-B. When the repetition check and the contents check are passed, the EHT STA may distinguish the 11ax PPDU and the EHT PPDU by decoding the packet indication information included in the EHT-SIG to distinguish it from the flax PPDU.

3. The length field is configured in the same way as in the example described in Section 2, and phase rotation of the symbol following (e.g., being contiguous to) the RL-SIG may be used for classification for the EHT PPDU.

3-A. According to an embodiment, one OFDM symbol following (e.g., being contiguous to) the RL-SIG may be a symbol configured for packet classification. According to an embodiment, one OFDM symbol following the RL-SIG may be configured as the first symbol among the symbols constituting the EHT-SIG.

3-B. Phase rotation may be applied to one OFDM symbol defined in Section 3-A for 11be packet classification. In other words, the EHT STA may determine whether the received PPDU is an EHT PPDU based on the phase rotation of one OFDM symbol defined in Section 3-A.

3-B-i. As phase rotation, pi ($\pi$) or pi/2 (i.e., 0.5 pi) may be applied. For example, pi/2 may be used as phase rotation. In this case, when BPSK modulation is applied to a symbol to which phase rotation is not applied, QBPSK modulation may be applied to a symbol to which phase rotation is applied.

3-C. The EHT STA may perform the repetition check and contents check for the RL-SIG in the same way as the 11ax STA. If the result of the "modular 3" operation for the length field is not 0, the EHT STA may determine whether the EHT PPDU is an EHT PPDU by performing a phase check on the next/contiguous symbol of the RL-SIG.

3-C-i. When the phase rotation of the symbol next/contiguous to the RL-SIG is detected as QBPSK, the EHT STA may recognize/determine that the received PPDU is an EHT PPDU and decode the received PPDU.

3-D. When the 11ax STA receives the EHT PPDU, it may perform repetition check and contents check for the RL-SIG. In this case, since the result of the modular 3 operation on the length field of the L-SIG is not 0, the 11ax STA may determine the received PPDU as the 11ax PPDU and perform a valid check on the HE-SIG-A. In this case, since the 11ax STA fails the valid check (e.g., CRC check), it may wait until the RX-time is over and then perform signal transmission/reception again.

3-E. When the 11ac STA receives the EHT PPDU, the 11ac STA may check the phase rotation for two symbols following (e.g., being contiguous to) the L-SIG. In this case, since the constellation of the two symbols is BPSK+QBPSK, the 11ac STA may recognize/determine the received EHT PPDU as the 11ac PPDU and perform a valid check for VHT-SIG-A.

3-E-i. When the 11ac STA receives the EHT PPDU, the valid check (e.g., CRC check) may fail or the CRC check may fail, so the 11ac STA can wait for Rx-time and then perform signal transmission/reception.

Case 2: Case in which EHT PPDU does not Include RL-SIG

When the EHT PPDU is configured as shown in FIG. 26 for signal transmission, in order to reduce packet false detection for a third party device (e.g., 11n/11ac/11ax STA), among the symbols constituting the EHT-SIG two symbols located after L-SIG may be transmitted using BPSK modulation.

For example, the 11n/11ac STA may recognize as its own packet when the constellation of two symbols following (e.g., being contiguous to) the L-SIG of the above-described EHT PPDU is QBPSK+QBPSK or BPSK+QBPSK. Therefore, when 2 symbols of EHT-SIG following L-SIG in EHT PPDU are modulated based on BPSK, the effect of reducing false detection by third party devices (e.g., 11n/11ac/11ax STAs) can be achieved.

For example, the 11ax STA first determines whether the L-SIG has been repeated. Since the EHT-SIG is received after the L-SIG in the above-described EHT PPDU, the content of the L-SIG and the Euclidean distance are distant. Therefore, there can be an effect of reducing false detection through the repetition check of the 11ax STA.

According to an embodiment, based on the packet indication information included in the EHT-SIG, a STA may determine the EHT PPDU. In this case, the EHT-SIG may include the following fields (or information).

a. The EHT-SIG may include a field (or, a Packet indication field) related to the Packet indication. The field related to the packet indication is located at the front of the EHT-SIG and may indicate the type (or version) of the PPDU. In other words, the field related to the packet indication may include information related to the type of the PPDU. The type (or version) of the PPDU may include a PPDU of an EHT standard or a PPDU (or a PPDU type) of a standard following the EHT standard. For example, the field related to the packet indication may be set to 2 to 4 bits.

For example, when the field related to the packet indication is set to 4 bits, each bit information may be set in various ways.

For example, when the field related to the packet indication is set to [0 0 0 0], the field related to the packet indication may indicate the EHT PPDU (or EHT packet).

For example, when the field related to the Packet indication is set to [0 0 0 1] to [1 1 1 1], the field related to the Packet indication may be reserved for the standard being defined after the EHT standard.

b. EHT-SIG may include a field (or Format indication field) related to the format indication. The field related to the format indication may indicate the format (format) of the PPDU. In other words, the field related to the format indication may include information related to the format of the PPDU. The format of the PPDU may include a SU/MU/TB (Trigger Based) EHT PPDU (or SU/MU/TB EHT PPDU format). For example, the field related to the format indication may be set to 1 to 2 bits.

For example, when the field related to the format indication is set to 2 bits, each bit information may be set in various ways. The field related to the format indication may indicate SU/MU/trigger based EHT PPDU. In other words, the field related to the format indication may include information related to the SU/MU/trigger based EHT PPDU.

For example, when the field related to the format indication is set to [0 0], the field related to the format indication may indicate (or represent) 'not-EHT PPDU' (or 'not-EHT packet').

For example, when the field related to the Format indication is set to [0 1], the field related to the Format indication may indicate (or represent) the SU EHT PPDU.

For example, when the field related to the Format indication is set to [1 0], the field related to the Format indication may indicate (or represent) the MU EHT PPDU.

For example, when the field related to the format indication is set to [1 1], the field related to the format indication may indicate (or represent) a TB (Trigger Based) EHT PPDU.

c. The EHT-SIG may include a field (or a BSS color field) related to the BSS color.

d. The EHT-SIG may include a TXOP-related field (or TXOP field).

e. The EHT-SIG may include a BW-related field (or BW field).

According to an embodiment, for an early indication for the packet, the EHT-SIG may be configured such that the packet indication bit comes to the front of the EHT-SIG.

According to an embodiment, contrary to the above-described embodiment, information (or fields) regarding BSS, BW, and TXOP may be sequentially located in front of the EHT-SIG for power saving. The EHT-SIG may be configured so that the packet indication bit is located after the information (or field) about the BSS, BW and TXOP.

According to an embodiment, contrary to the above-described embodiment, information (or fields) related to the BSS, BW, and TXOP may be sequentially located in front of the EHT-SIG for power saving. The EHT-SIG may be configured so that the packet indication bit is located after the information (or field) related to the BSS, BW and TXOP.

Figure 27:
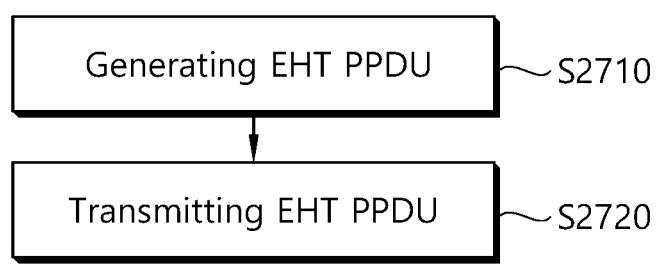
FIG. 27 is a flowchart illustrating an operation of a transmitting STA.

FIG. 27 is a flowchart illustrating an operation of a transmitting STA.

Referring to FIG. 27, in step S2710, the transmitting STA may generate an EHT PPDU. According to an embodiment, the EHT PPDU may include various fields. For example, the EHT PPDU may include an L-SIG field, an RL-SIG field, a first control field, and a second control field. As an example, the RL-SIG field may be continuous to the L-SIG field. As an example, the first control field may be continuous to the RL-SIG field. As an example, the second control field may be continuous to the first control field.

According to an embodiment, the transmitting STA may set the value of the length field of the L-SIG field based on the transmission time of the EHT PPDU. For example, a result of "modulo 3 operation" to a value of the length field of the L-SIG field may be set to "0".

According to an embodiment, the RL-SIG field may be configured such that the L-SIG field is repeated. For example, the RL-SIG field includes the same information field as the L-SIG field and may be modulated in the same manner. The L-SIG field and the RL-SIG field may be modulated through BPSK, respectively.

According to an embodiment, the first control field may include information related to the EHT PPDU. For example, the first control field may include 3-bit information related to a version of the PPDU, 6-bit information related to a basic service set (BSS) color, and 7-bit information related to a transmission opportunity (TXOP). For example, the first control field may include a universal signal (U-SIG).

For example, the first control field may include 3-bit information related to the version of the PPDU. The 3-bit information related to the version of the PPDU may include information indicating that the EHT PPDU is a PPDU based on the EHT standard. In addition, the 3-bit information related to the version of the PPDU may include information for distinguishing the PPDU according to the 802.11be standard (i.e., the EHT standard) or a further standard. In other words, the 3-bit information related to the version of the PPDU may include information for classifying the EHT standard and the PPDU according to the standard determined/generated/established after the EHT standard. That is, the 3-bit information related to the version of the PPDU may include information indicating that the PPDU is based on an EHT standard or on a next version of the EHT standard.

According to an embodiment, the type of the PPDU and the version of the PPDU may be used separately. The type of PPDU may be used to distinguish the PPDU according to the EHT standard and the standard before the EHT standard (e.g., 802.11n/ac/ax). On the other hand, the version of the PPDU may be used to distinguish the PPDU according to the EHT standard and the standard after the EHT standard. For example, the version of the PPDU may be called variously. For example, the version of the PPDU may be referred to as a physical (PHY) version, a Packet version, a Packet identifier, and a Wi-Fi version.

According to an embodiment, the first control field may further include 6-bit information related to BSS color and 7-bit information related to TXOP.

According to an embodiment, the first control field may further include first cyclic redundancy check (CRC) bits and first tail bits related to the first control field. The first CRC bits may be used for valid check in the receiving STA. For example, the first CRC bits may consist of 4 bits. For example, the first tail bits may consist of 6 bits.

According to an embodiment, the second control field may include second CRC bits and second tail bits for two control fields. The second control field may include an EHT-SIG.

According to an embodiment, the first control field and the second control field may be encoded, separately/respectively. For example, the first control field may be jointly encoded. In addition, the first control field and the second control field may be modulated, separately/respectively.

In step S2720, the transmitting STA may transmit an EHT PPDU.

According to an embodiment, each field included in the EHT PPDU may be transmitted through a symbol. For example, the L-SIG field may be transmitted through the first symbol. The RL-SIG field may be transmitted through a second symbol contiguous to the first symbol. The first control field may be transmitted through a third symbol contiguous to the second symbol. The second control field may be transmitted through a fourth symbol contiguous to the third symbol.

For example, the first symbol may consist of one symbol. The second symbol may consist of one symbol. The third symbol may consist of two symbols. Accordingly, the first control field may be transmitted over two symbols. For example, the fourth symbol may be composed of at least one or at least one or more symbols. Accordingly, the second control field may be transmitted through at least one or more symbols contiguous to two symbols in which the first control field is transmitted.

Figure 28:
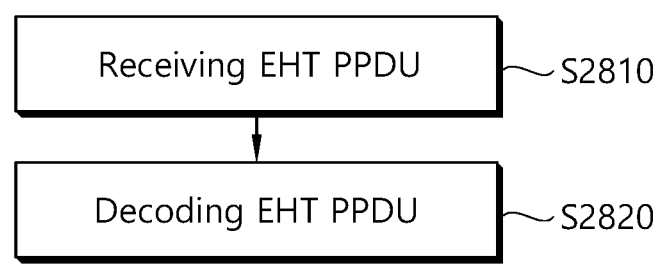
FIG. 28 is a flowchart illustrating an operation of a receiving STA.

FIG. 28 is a flowchart illustrating an operation of a receiving STA.

Referring to FIG. 28, in step S2810, the receiving STA may receive an EHT PPDU.

According to an embodiment, the EHT PPDU may include various fields. For example, the EHT PPDU may include an L-SIG field, an RL-SIG field, a first control field, and a second control field. As an example, the RL-SIG field may be continuous to the L-SIG field. As an example, the first control field may be continuous to the RL-SIG field. As an example, the second control field may be continuous to the first control field.

According to an embodiment, the value of the length field of the L-SIG field may be set based on the transmission time of the EHT PPDU. For example, the result of "modulo 3 operation" to the value of the length field of the L-SIG field may be set to "0".

According to an embodiment, the RL-SIG field may be configured such that the L-SIG field is repeated. For example, the RL-SIG field includes the same information field as the L-SIG field and may be modulated in the same manner. The L-SIG field and the RL-SIG field may be modulated through BPSK, respectively.

According to an embodiment, the first control field may include information related to the EHT PPDU. For example, the first control field may include 3-bit information related to a version of the PPDU, 6-bit information related to a basic service set (BSS) color, and 7-bit information related to a transmission opportunity (TXOP). For example, the first control field may include a universal signal (U-SIG).

For example, the first control field may include 3-bit information related to the version of the PPDU. The 3-bit information related to the version of the PPDU may include information indicating that the EHT PPDU is a PPDU based on the EHT standard. In addition, the 3-bit information related to the version of the PPDU may include information for distinguishing the PPDU according to the 802.11be standard (i.e., the EHT standard) or a further standard. In other words, the 3-bit information related to the version of the PPDU may include information for classifying the EHT standard and the PPDU according to the standard determined/generated/established after the EHT standard. That is, the 3-bit information related to the version of the PPDU may include information indicating that the PPDU is based on an EHT standard or on a next version of the EHT standard. For example, based on the 3-bit information related to the version of the PPDU being the first value, the 3-bit information related to the version of the PPDU may include information indicating that the PPDU is an EHT standard. For example, based on the 3-bit information related to the version of the PPDU being [000], the 3-bit information related to the version of the PPDU may include information indicating that the PPDU is an EHT standard.

According to an embodiment, the type of the PPDU and the version of the PPDU may be used separately. The type of PPDU may be used to distinguish the PPDU according to the EHT standard and the standard before the EHT standard (e.g., 802.11n/ac/ax). On the other hand, the version of the PPDU may be used to distinguish the PPDU according to the EHT standard and the standard after the EHT standard. For example, the version of the PPDU may be called variously. For example, the version of the PPDU may be referred to as a physical (PHY) version, a Packet version, a Packet identifier, and a Wi-Fi version.

According to an embodiment, the receiving STA may determine the type of the PPDU based on whether the L-SIG field is repeated and the "modulo 3 operation" to the value of the length field. For example, when receiving the EHT PPDU, the receiving STA may perform a process for confirming that the received PPDU (i.e., EHT PPDU) is a PPDU configured/constructed based on the EHT standard.

As an example, the receiving STA may determine whether to repeat the L-SIG field. The receiving STA may check whether the received EHT PPDU includes the RL-SIG field in which the L-SIG field is repeated. Thereafter, the receiving STA may perform "modulo 3 operation" to the value of the length field.

For example, the receiving STA may confirm that the received EHT PPDU includes the RL-SIG field. In addition, the receiving STA may confirm that the result of "modulo 3 operation" to the value of the length field of the received EHT PPDU is "0". The receiving STA may confirm that it has received the EHT PPDU.

According to an embodiment, the receiving STA may check the type and/or version of the received EHT PPDU based on the first control field of the EHT PPDU. The 3-bit information related to the version of the PPDU may include information indicating that the EHT PPDU is a PPDU based on the EHT standard.

Accordingly, the receiving STA may confirm that the received PPDU is an EHT PPDU based on whether the L-SIG field is repeated or not and based on "modulo 3 operation" applied to the value of the length field. In addition, the receiving STA may confirm that the received PPDU is an EHT PPDU based on 3-bit information related to the PPDU version.

According to an embodiment, the first control field may further include 6-bit information related to BSS color and 7-bit information related to TXOP.

According to an embodiment, the first control field may further include first cyclic redundancy check (CRC) bits and first tail bits related to the first control field. The first CRC bits may be used for valid check by the receiving STA. For example, the first CRC bits may consist of 4 bits. For example, the first tail bits may consist of 6 bits.

According to an embodiment, the second control field may include second CRC bits and second tail bits for two control fields. The second control field may include an EHT-SIG.

According to an embodiment, the first control field and the second control field may be encoded, separately/respectively. For example, the first control field may be jointly encoded. In addition, the first control field and the second control field may be modulated, separately/respectively. Accordingly, the receiving STA may receive the encoded first control field and the second control field, respectively.

According to an embodiment, each field included in the EHT PPDU may be received through a symbol. For example, the L-SIG field may be received through the first symbol. The RL-SIG field may be received through a second symbol contiguous to the first symbol. The first control field may be received through a third symbol contiguous to the second symbol. The second control field may be received through a fourth symbol contiguous to the third symbol.

For example, the first symbol may consist of one symbol. The second symbol may consist of one symbol. The third symbol may consist of two symbols. Accordingly, the first control field may be received through two symbols. For example, the fourth symbol may be composed of at least one or at least one or more symbols. Accordingly, the second control field may be received through at least one or more symbols contiguous to two symbols in which the first control field is transmitted.

In step S2820, the receiving STA may decode the EHT PPDU. According to an embodiment, the receiving STA may decode the EHT PPDU based on the first control field and the second control field. In addition, the receiving STA may decode the first control field and the second control field, separately/respectively.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 19. For example, the apparatus of the present specification includes a processor and a memory coupled to the processor, wherein the processor is configured to: generate an Extreme High Throughput (EHT) Physical Protocol Data Unit (PPDU) including a legacy signal (L-SIG) field, a repeated L-SIG (RL-SIG) field, a first control field, and a second control field, wherein a result of "modulo 3 operation" to a value of a length field of the L-SIG field is set to "0", wherein the RL-SIG field is configured to be same as the L-SIG field, wherein the control field includes 3-bit information related to a version of a PPDU, 6-bit information related to a basic service set (BSS) color, and 7-bit information related to a transmission opportunity (TXOP), wherein the first control field further includes first cyclic redundancy check (CRC) bits and first tail bits for the first control field, wherein the second control field includes second CRC bits and second tail bits for the second control field, wherein the first control field and the second control field are separately encoded; and transmit the EHT PPDU.

The technical features of the present specification may be implemented based on a CRM (computer readable medium). For example, the CRM proposed by the present specification may store instructions that perform operations comprising: generating an Extreme High Throughput (EHT) Physical Protocol Data Unit (PPDU) including a legacy signal (L-SIG) field, a repeated L-SIG (RL-SIG) field, a first control field, and a second control field, wherein a result of "modulo 3 operation" to a value of a length field of the L-SIG field is set to "0", wherein the RL-SIG field is configured to be same as the L-SIG field, wherein the control field includes 3-bit information related to a version of a PPDU, 6-bit information related to a basic service set (BSS) color, and 7-bit information related to a transmission opportunity (TXOP), wherein the first control field further includes first cyclic redundancy check (CRC) bits and first tail bits for the first control field, wherein the second control field includes second CRC bits and second tail bits for the second control field, wherein the first control field and the second control field are separately encoded; and transmitting the EHT PPDU. The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a transmitting station (STA) in a Wireless Local Area Network (WLAN) system, the method comprising:

generating an Extremely High Throughput (EHT) Physical Protocol Data Unit (PPDU) including a legacy signal (L-SIG) field, a repeated L-SIG (RL-SIG) field, a control signal field being contiguous to the RL-SIG field, an EHT Short Training Field (STF), and an EHT Long Training Field (LTF) which is contiguous to the EHT STF, wherein the L-SIG field includes a length field, the length field is set to a value satisfying a condition that a remainder is zero when the length field is divided by three, and the remainder differentiates the EHT PPDU from a High Efficiency (HE) PPDU, wherein the RL-SIG field is a repeat of the L-SIG field and is contiguous to the L-SIG field, wherein the RL-SIG field and the control signal field are configured based on Binary Phase-Shift Keying (BPSK), wherein the control signal field includes first information related to a physical version of the EHT PPDU, second information related to a bandwidth of the EHT PPDU, third information related to a basic service set (BSS) color, fourth information related to a transmission opportunity (TXOP), and fifth information related to a PPDU type, wherein the fifth information has a length of two bits, and a value of the fifth information indicates a single user (SU) transmission or a trigger-based (TB) PPDU, and wherein the first information has a length of three bits and is set to zero for the EHT PPDU; and transmitting the EHT PPDU.

2. The method of claim 1, wherein the fifth information is set to one to indicate the SU transmission.

3. A transmitting station (STA) in a Wireless Local Area Network (WLAN) system comprising:

a transceiver configured to transmit and/or receive a wireless signal; and a processor coupled to the transceiver, wherein the processor is further configured to:

generate an Extremely High Throughput (EHT) Physical Protocol Data Unit (PPDU) including a legacy signal (L-SIG) field, a repeated L-SIG (RL-SIG) field, a control signal field being contiguous to the RL-SIG field, an EHT Short Training Field (STF), and an EHT Long Training Field (LTF) which is contiguous to the EHT STF,
wherein the L-SIG field includes a length field, the length field is set to a value satisfying a condition that a remainder is zero when the length field is divided by three, and the remainder differentiates the EHT PPDU from a High Efficiency (HE) PPDU,
wherein the RL-SIG field is a repeat of the L-SIG field and is contiguous to the L-SIG field,
wherein the RL-SIG field and the control signal field are configured based on Binary Phase-Shift Keying (BPSK),
wherein the control signal field includes first information related to a physical version of the EHT PPDU, second information related to a bandwidth of the EHT PPDU, third information related to a basic service set (BSS) color, fourth information related to a transmission opportunity (TXOP), and fifth information related to a PPDU type,
wherein the fifth information has a length of two bits, and a value of the fifth information indicates a single user (SU) transmission or a trigger-based (TB) PPDU, and
wherein the first information has a length of three bits and is set to zero for the EHT PPDU; and
transmit the EHT PPDU.

4. The STA of claim 3, wherein the fifth information is set to one to indicate the SU transmission.

5. A receiving station (STA) in a Wireless Local Area Network (WLAN) system comprising:
a transceiver configured to transmit and/or receive a wireless signal; and
a processor coupled to the transceiver,
wherein the processor is further configured to:
receive an Extremely High Throughput (EHT) Physical Protocol Data Unit (PPDU) including a legacy signal (L-SIG) field, a repeated L-SIG (RL-SIG) field, a control signal field being contiguous to the RL-SIG field, an EHT Short Training Field (STF), and an EHT Long Training Field (LTF) which is contiguous to the EHT STF,
wherein the L-SIG field includes a length field, the length field is set to a value satisfying a condition that a remainder is zero when the length field is divided by three, and the remainder differentiates the EHT PPDU from a High Efficiency (HE) PPDU,
wherein the RL-SIG field is a repeat of the L-SIG field and is contiguous to the L-SIG field,
wherein the RL-SIG field and the control signal field are configured based on Binary Phase-Shift Keying (BPSK),
wherein the control signal field includes first information related to a physical version of the EHT PPDU, second information related to a bandwidth of the EHT PPDU, third information related to a basic service set (BSS) color, fourth information related to a transmission opportunity (TXOP), and fifth information related to a PPDU type,
wherein the fifth information has a length of two bits, and a value of the fifth information indicates a single user (SU) transmission or a trigger-based (TB) PPDU, and
wherein the first information has a length of three bits and is set to zero for the EHT PPDU.

6. The receiving STA of claim 5, wherein the fifth information is set to one to indicate the SU transmission.

\* \* \* \* \*